US012679172B2

(12) United States Patent
Xiao et al.

(10) Patent No.: US 12,679,172 B2
(45) Date of Patent: Jul. 14, 2026

(54) AIR INTAKE STRUCTURE FOR VEHICLE SUNROOF AND RECREATIONAL VEHICLE (RV) WITH SUNROOF

(71) Applicant: JIANGSU SANJO INTELLIGENT TECHNOLOGY CO., LTD., Changzhou (CN)

(72) Inventors: Heping Xiao, Changzhou (CN); Qingqing Hu, Changzhou (CN)

(73) Assignee: JIANGSU SANJO INTELLIGENT TECHNOLOGY CO., LTD., Changzhou (CN)

( * ) Notice: Subject to any disclaimer, the term of this patent is extended or adjusted under 35 U.S.C. 154(b) by 387 days.

(21) Appl. No.: 18/387,066

(22) Filed: Nov. 6, 2023

(65) Prior Publication Data

US 2024/0359534 A1     Oct. 31, 2024

Related U.S. Application Data

(63) Continuation of application No. PCT/CN2023/115140, filed on Aug. 28, 2023.

(30) Foreign Application Priority Data

Apr. 26, 2023     (CN) .......................... 202310456546.7

(51) Int. Cl.
*B60H 1/26* (2006.01)
*B60J 7/16* (2006.01)
(52) U.S. Cl.
CPC ........... *B60H 1/262* (2013.01); *B60J 7/1642* (2013.01)

(58) Field of Classification Search
CPC .... B60H 1/262; B60H 1/245; B60H 1/00364; B60J 1/1642
See application file for complete search history.

(56) References Cited

U.S. PATENT DOCUMENTS

| | | | | |
|---|---|---|---|---|
| 4,452,129 A | * | 6/1984 | Kelley | ..................... B60H 1/26 454/145 |
| 5,344,361 A | | 9/1994 | Matthias | |
| 5,672,101 A | | 9/1997 | Thomas | |
| 7,004,832 B2 | * | 2/2006 | Thomas | ............. B60H 1/00364 454/94 |
| 2016/0200174 A1 | | 7/2016 | Tremer et al. | |

(Continued)

FOREIGN PATENT DOCUMENTS

| | | |
|---|---|---|
| CN | 202623853 U | 12/2012 |
| CN | 206690835 U | 12/2017 |
| CN | 211852235 U | 11/2020 |

(Continued)

*Primary Examiner* — Allen R. B. Schult
(74) *Attorney, Agent, or Firm* — COOPER LEGAL GROUP LLC

(57) ABSTRACT

An air intake structure for a vehicle sunroof is provided. The air intake structure for a vehicle sunroof includes a base, an outer cover, and a grille shutter, where a front end of the base is hinged with a front end of the outer cover; a ventilation duct is formed in the base in a penetrating manner; the grille shutter is provided below a rear end of the outer cover; the grille shutter is detachably connected to the outer cover; the grille shutter is located outside an air intake of the ventilation duct. The grille shutter of the air intake structure is detachably connected to the outer cover.

19 Claims, 21 Drawing Sheets

(56) References Cited

U.S. PATENT DOCUMENTS

| | | | |
|---|---|---|---|
| 2018/0105020 A1 | 4/2018 | Smith et al. | |
| 2024/0010047 A1* | 1/2024 | Feltham | ................ B60H 1/248 |

FOREIGN PATENT DOCUMENTS

| | | | | |
|---|---|---|---|---|
| CN | 214267329 U | 9/2021 | | |
| CN | 116198287 A | 6/2023 | | |
| CN | 116638937 A | 8/2023 | | |
| CN | 219487148 U | 8/2023 | | |
| DE | 2839786 A1 | 3/1980 | | |
| EP | 0382123 A2 | 8/1990 | | |
| EP | 2423406 A1 | 2/2012 | | |
| GB | 1166200 A | * 10/1969 | ............. | B60H 1/262 |

* cited by examiner

AIR INTAKE STRUCTURE FOR VEHICLE SUNROOF AND RECREATIONAL VEHICLE (RV) WITH SUNROOF

CROSS REFERENCE TO THE RELATED APPLICATIONS

This application is a continuation application of International Application No. PCT/CN2023/115140, filed on Aug. 28, 2023, which is based upon and claims priority to Chinese Patent Application No. 202310456546.7, filed on Apr. 26, 2023, the entire contents of which are incorporated herein by reference.

TECHNICAL FIELD

The present disclosure belongs to the technical field of vehicle sunroofs, and particularly relates to an air intake structure for a vehicle sunroof and a recreational vehicle (RV) with the sunroof.

BACKGROUND

A sunroof is provided at a top of an existing RV. The sunroof includes a base and an outer cover. A ventilation duct is formed in the base in a penetrating manner. A front end of the outer cover is hinged with a front end of the base. When the outer cover rotates upward away from the base, a carriage communicates with the outside through the ventilation duct, and the sunroof is opened. When the outer cover rotates close to the base to cover an air intake of the ventilation duct, the sunroof is closed. The patent No. CN 205097897 U provides an RV sunroof. According to the RV sunroof, an air intake of a ventilation duct directly communicates with the outside, and there is no grille shutter. Consequently, sundries and the like enter the ventilation duct and the carriage easily. On the other hand, an airflow directly impacts the ventilation duct, such that the internal structure of the sunroof is damaged easily, the airflow is unstable and the poor comfort is caused. In view of the above problem, the U.S. Pat. No. 10,858,884 B2 provides an electric potentially-driven shade with an improved coil strength, and/or a method of making the same, and specifically discloses the following features: the foldable ventilation hole is closed. A grille shutter is hinged between the outer cover and the base. The grille shutter is located behind the base and outside the air intake of the ventilation duct. However, with a complex installation structure, it is difficult to detach and clean the grille shutter. Meanwhile, the grille shutter becomes loose easily which causes a shake and an abnormal sound.

SUMMARY

The present disclosure provides an air intake structure for a vehicle sunroof and an RV with the sunroof, to solve the problem of difficult detachment of a grille shutter of an RV sunroof in the prior art.

To solve the above-mentioned technical problem, the present disclosure employs the following technical solutions: An air intake structure for a vehicle sunroof includes a base, an outer cover, and a grille shutter, where a front end of the base is hinged with a front end of the outer cover; a ventilation duct is formed in the base in a penetrating manner; the grille shutter is provided below a rear end of the outer cover; the grille shutter is detachably connected to the outer cover; the grille shutter is located outside an air intake of the ventilation duct; when the outer cover cooperates with the base to cover the air intake, an avoidance gap is formed between the grille shutter and the base; and when the outer cover rotates away from the base to open the air intake, the outer cover drives the grille shutter to move close to the base, the avoidance gap becomes smaller gradually, and an external airflow sequentially passes through the grille shutter, the air intake and the ventilation duct to enter a carriage;

an end of the grille shutter close to the base is provided with a roller assembly; the roller assembly includes a rolling wheel; a track is provided on the base; and the track matches with a rotating path of the grille shutter, such that the rolling wheel abuts against the track all the time during rotation of the grille shutter; and the roller assembly further includes a rotating shaft and a connecting rod, a guide groove is formed in the grille shutter; the connecting rod includes one end slidably provided in the guide groove, and the other end connected to the rotating shaft; the rolling wheel is sleeved on the rotating shaft; and a spring is provided between an end of the connecting rod away from the rotating shaft and the guide groove.

The rolling wheel is pressed on the track all the time under an action of the spring. Through undulation of the track, a shaking space of the outer cover in opening and closing is eliminated. The roller assembly has a simple and reliable structure, a skillful design, and a stable operation.

Further, the outer cover has an opening angle of α, $0°<α≤10°$. This not only ensures effective ventilation of the sunroof after the outer cover is opened, but also makes the sunroof reliable, stable, safe and aesthetically-pleasing.

Preferably, a sealing ring is provided at the air intake, and when the outer cover cooperates with the base to cover the air intake, the outer cover comes in contact with the sealing ring. This ensures sealing performance of the closed outer cover, and effectively prevents air leakage and water leakage of the sunroof.

Further, the grille shutter is detachably connected to the outer cover through bolts. This achieves a simple and reliable structure, convenient installation and detachment, and a low cost.

Further, a plurality of support rods are fixed at a bottom of the outer cover; the plurality of support rods are sequentially arranged around a periphery of the grille shutter; and the grille shutter is connected to the support rods sequentially by the bolts. This optimizes the installation structure of the grille shutter, and makes the grille shutter installed more reliably and stably.

An RV with a sunroof includes the air intake structure for a vehicle sunroof, where the base is provided at a top of the RV, and both the outer cover and the grille shutter are exposed out of the RV.

Preferably, the vehicle sunroof further includes a lifting mechanism, the lifting mechanism is configured to drive the outer cover to rotate upward to open the ventilation duct or rotate downward to close the ventilation duct; the lifting mechanism includes an electric drive structure and a manual drive structure; the electric drive structure includes a threaded rod, a first cantilever, a second cantilever, and a motor; the manual drive structure includes a gear set and a handle; the threaded rod is horizontally provided on the base along a width direction of an RV and located behind the ventilation duct; a bottom end of the first cantilever is threadedly connected to the threaded rod through a first slider; a bottom end of the second cantilever is threadedly connected to the threaded rod through a second slider; a top end of the first cantilever and a top end of the second cantilever are connected to the outer cover through a supporting seat; the first cantilever intersects with the second cantilever; an output end of the motor is connected to one end of the threaded rod; the gear set includes an input end connected to the handle, and an output end connected to an end of the threaded rod away from the motor; and when the threaded rod rotates, the first cantilever and the second cantilever are driven to move close to each other or away from each other. When the outer cover is to be opened and closed manually, particularly in a power failure, there is only a need to manually rotate the handle in the RV. The handle drives the threaded rod through the gear set to rotate. The rotating threaded rod drives the first slider and the second slider to slide along the threaded rod. When the first slider and the second slider slide close to each other or away from each other, the first cantilever and the second cantilever drive the outer cover upward to open, or drive the outer cover downward to close. The gear set has stable transmission with a high transmission efficiency. Particularly compared with a flexible shaft, the transmission efficiency is improved significantly, and the manual operation is labor-saving and convenient.

Preferably, the vehicle sunroof further includes an upper assembly and a lower assembly; the base, the outer cover and the grille shutter form the upper assembly; and when the outer cover closes the ventilation duct, the grille shutter is horizontally provided, and grille holes of the grille shutter gradually incline forward from bottom to top;

the lower assembly includes a lower seat and a filter screen assembly; the ventilation duct penetrates through the lower seat; the filter screen assembly includes a filter screen frame and a filter screen on the filter screen frame; the filter screen frame is detachably connected to the lower seat; and the filter screen is located in the ventilation duct; and the base and the lower seat are respectively provided at an upper side and a lower side of a top plate of an RV; a bottom of the base serves as a first cylindrical portion; a top of the filter screen frame serves as a second cylindrical portion; the first cylindrical portion and the second cylindrical portion are sleeved and are capable of moving along a thickness direction of the top plate; and when the outer cover opens the ventilation duct, an outside of the RV, the grille shutter, the ventilation duct, the filter screen frame and the carriage of the RV are sequentially communicated with each other.

In response to maintenance of the filter screen assembly, the lower assembly is detached, and the filter screen assembly is detached from the lower assembly. With convenient detachment, the filter screen is repaired, maintained and cleaned conveniently in daily life. Meanwhile, since the second cylindrical portion of the filter screen frame and the first cylindrical portion of the base are sleeved, and can move along the thickness direction of the top plate, top plates with different thicknesses can be matched. That is, the top plates with the different thicknesses are matched by allowing the second cylindrical portion of the filter screen frame and the first cylindrical portion of the upper seat to move along the thickness direction of the top plate. In this case, the first cylindrical portion and the second cylindrical portion are still sleeved to allow the airflow to pass through. While achieving a skillful structure, this ensures convenient detachment of the filter screen assembly, and matches the top plates with the different thicknesses.

Further, the grille holes each have an inclination angle of β, the β being in a range of 30° to 60°. This ensures smooth connection between the grille hole and the outer cover with no obstruction and more smooth airflow in ventilation, and effectively increases a ventilation volume.

Further, the grille hole has a cross-sectional area of S, the S being in a range of 3.0 cm$^2$ to 3.6 cm$^2$. With the appropriate grille hole, not only is the airflow combed to become smoother and more comfortable, but also sundries, mosquitoes and the like are effectively filtered. In cooperation with the filter screen, double-layer filtration is realized to effectively prevent the mosquitoes, and make the filtered air clean and fresh. The grille shutter is more aesthetically-pleasing for a small perspective area.

Further, the lower seat is detachably connected to the top plate through a first bolt, and the filter screen frame is detachably connected to the lower seat through a second bolt. The lower assembly is detached by detaching the first bolt. By detaching the second bolt, the filter screen assembly is detached from the lower assembly. With convenient detachment, the filter screen is repaired, maintained and cleaned conveniently in daily life.

Further, a decorative cover is provided at a bottom of the lower seat, and the first bolt is fixedly connected to the decorative cover, the lower seat and the top plate in sequence. While taking protective and dustproof actions, the decorative cover is aesthetically-pleasing.

Further, a pleated blackout fabric is provided in the decorative cover; a side air vent is formed at a side of the decorative cover; and when the pleated blackout fabric is unfolded, the pleated blackout fabric covers the ventilation duct, and the side air vent communicates with the ventilation duct and the carriage of the RV. While taking an aesthetically-pleasing action, the unfolded pleated blackout fabric increases an air volume of the side air vent and changes an air-out direction. A pattern may be provided on the pleated blackout fabric to be more aesthetically-pleasing.

The present disclosure has the following beneficial effects:

1. According to the air intake structure for a vehicle sunroof provided by the present disclosure, the grille shutter is detachably connected to the outer cover. The grille shutter is installed and detached conveniently, and can be taken down conveniently for maintenance such as cleaning. The structure is simple and skillful, and the cost is low.

2. According to the air intake structure for a vehicle sunroof provided by the present disclosure, the roller assembly has a skillful design, a simple and reliable structure, and a stable operation. The rolling wheel is pressed on the track all the time. Through undulation of the track, a shaking space of the outer cover in opening and closing is eliminated. This effectively prevents the outer cover and the grille shutter from becoming loose or unstable, and avoids an abnormal sound.

3. According to the air intake structure for a vehicle sunroof provided by the present disclosure, when the outer cover is to be opened and closed manually, particularly in a power failure, there is only a need to manually rotate the handle in the RV. The handle drives the threaded rod through the gear set to rotate. The rotating threaded rod drives the first slider and the second slider to slide along the threaded rod. When the first slider and the second slider slide close to each other or away from each other, the first cantilever and the second cantilever drive the outer cover upward to open, or drive the outer cover downward to close. The gear set has stable transmission with a high transmission efficiency. Particularly compared with a flexible shaft, the transmission efficiency is improved significantly, and the manual operation is labor-saving and convenient.

4. According to the RV sunroof provided by the present disclosure, the lower assembly is detached, and the filter screen assembly is detached from the lower assembly. With convenient detachment, the filter screen is repaired, maintained and cleaned conveniently in daily life. Meanwhile, since the second cylindrical portion of the filter screen frame and the first cylindrical portion of the upper seat are sleeved, and can move along the thickness direction of the top plate, top plates with different thicknesses can be matched. That is, the top plates with the different thicknesses are matched by allowing the second cylindrical portion of the filter screen frame and the first cylindrical portion of the upper seat to move along the thickness direction of the top plate. In this case, the first cylindrical portion and the second cylindrical portion are still sleeved to allow the airflow to pass through. While achieving a skillful structure, this ensures convenient detachment of the filter screen assembly, and installs the sunroof on the top plates with the different thicknesses.

5. According to the RV sunroof provided by the present disclosure, the outer cover rotates away from the upper seat to open the ventilation duct. Meanwhile, the outer cover drives the grille shutter to move, until the outer cover is opened to a preset angle. In this case, an outside of the RV, the grille shutter, the ventilation duct, the filter screen and the carriage of the RV are sequentially communicated with each other. An external airflow of the RV sequentially passes through the grille shutter, the ventilation duct and the filter screen to enter the carriage. An internal airflow of the RV is exhausted by sequentially passing through the filter screen, the ventilation duct and the grille shutter, thereby realizing air ventilation. The grille holes gradually incline forward from bottom to top. This ensures smooth connection between the grille hole and the outer cover with no obstruction and more smooth airflow in ventilation, and effectively increases a ventilation volume. With the appropriate grille hole, not only is the airflow combed to become smoother and more comfortable, but also sundries, mosquitoes and the like are effectively filtered. In cooperation with the filter screen, double-layer filtration is realized to effectively prevent the mosquitoes, and make the filtered air clean and fresh. The grille shutter is more aesthetically-pleasing for a small perspective area.

6. According to the RV sunroof provided by the present disclosure, the grille shutter can filter the sundries, the mosquitoes and the like, and can realize double-layer filtration in cooperation with the filter screen to effectively prevent the mosquitoes, and make the filtered air clean and fresh. The grille shutter effectively prevents foreign matters from entering the RV sunroof and damaging the RV sunroof. The filter screen assembly can be detached. Particularly when the filter screen is detached for maintenance such as cleaning, the RV sunroof can still be used normally. The effects of the grille shutter for filtering the sundries, the mosquitoes and the like basically meet use requirements.

BRIEF DESCRIPTION OF THE DRAWINGS

In order to more clearly illustrate the technical solutions in the embodiment of the present invention, the drawings used in the description of the embodiment will be briefly described below. It is obvious that the drawings in the following description are only some embodiments of the present invention. For those skilled in the art, other drawings can be obtained according to these drawings without creative efforts.

In the figures: 1: base, 1-1: ventilation duct, 1-2: air intake, 1-3: track, 1-4: first cylindrical portion, 2: outer cover, 3: grille shutter, 3-1: limiting groove, 3-2: guide groove, 3-3: grille hole, 4: avoidance gap, 5: air spring, 6: limiting plate, 7: sealing ring, 8: support rod, 9: roller assembly, 9-1: rolling wheel, 9-2: rotating shaft, 9-3: connecting rod, 9-4: spring, 10: lifting mechanism, 10-1: electric drive structure, 10-1-1: threaded rod, 10-1-2: first cantilever, 10-1-3: second cantilever, 10-1-4: motor, 10-1-5: first slider, 10-1-6: second slider, 10-1-7: supporting seat, 10-2: manual drive structure, 10-2-1: gear set, 10-2-3: handle, 11: upper assembly, 11-16: ventilation fan, 12: lower assembly, 12-1: lower seat, 12-2: filter screen assembly, 12-21: filter screen frame, 12-211: second cylindrical portion, 12-22: filter screen, 12-3: decorative cover, 12-31: side air vent, 12-4: pleated blackout fabric, 13: top plate, a: opening angle of outer cover, and P: inclination angle of grille hole.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. The following description of at least one exemplary example is merely illustrative, and not intended to limit the present disclosure and application or use thereof in any way. All other embodiments obtained by a person of ordinary skill in the art on the basis of the embodiments of the present disclosure without creative efforts shall fall within the protection scope of the present disclosure.

Embodiment 1

For ease of description, a head direction is used as a front direction in the embodiment. As shown in FIGS. 1-11, an air intake structure for a vehicle sunroof includes base 1, outer cover 2, and grille shutter 3. A front end of the base 1 is hinged with a front end of the outer cover 2. Ventilation duct 1-1 is formed in the base 1 in a penetrating manner. The grille shutter 3 is provided below a rear end of the outer cover 2. The grille shutter 3 is detachably connected to the outer cover 2. The grille shutter 3 is located outside air intake 1-2 of the ventilation duct 1-1. When the outer cover 2 cooperates with the base 1 to cover the air intake 1-2, avoidance gap 4 is formed between the grille shutter 3 and the base 1. When the outer cover 2 rotates away from the base 1 to open the air intake 1-2, the outer cover 2 drives the grille shutter 3 to move close to the base 1, the avoidance gap 4 becomes smaller gradually, and an external airflow sequentially passes through the grille shutter 3, the air intake 1-2 and the ventilation duct 1-1 to enter a carriage.

Figure 1:
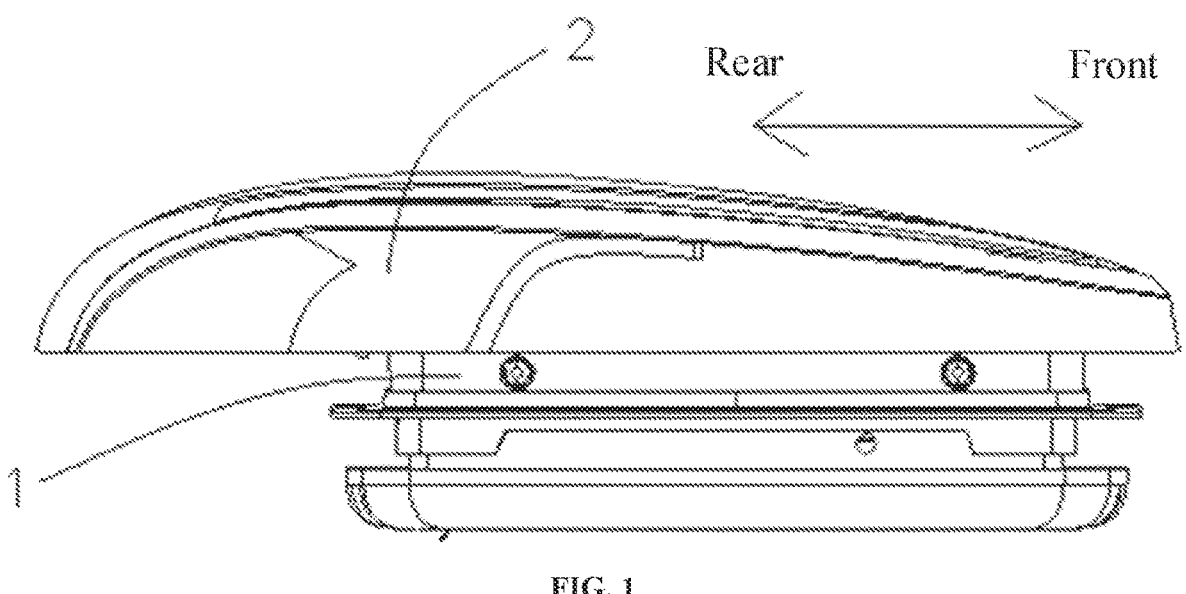
FIG. 1 is a side view of an air intake structure for a vehicle sunroof according to Embodiment 1 of the present disclosure, where an outer cover is closed.
Figure 2:
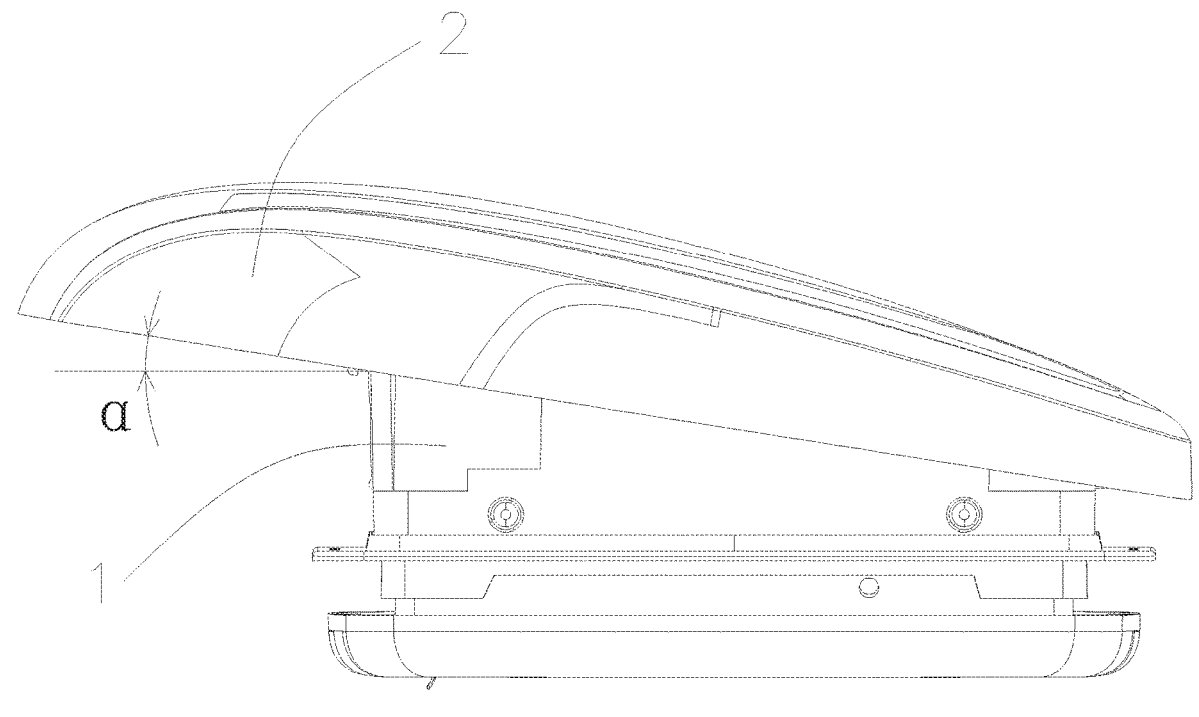
FIG. 2 is a side view of an air intake structure for a vehicle sunroof according to Embodiment 1 of the present disclosure, where an outer cover is opened.
Figure 3:
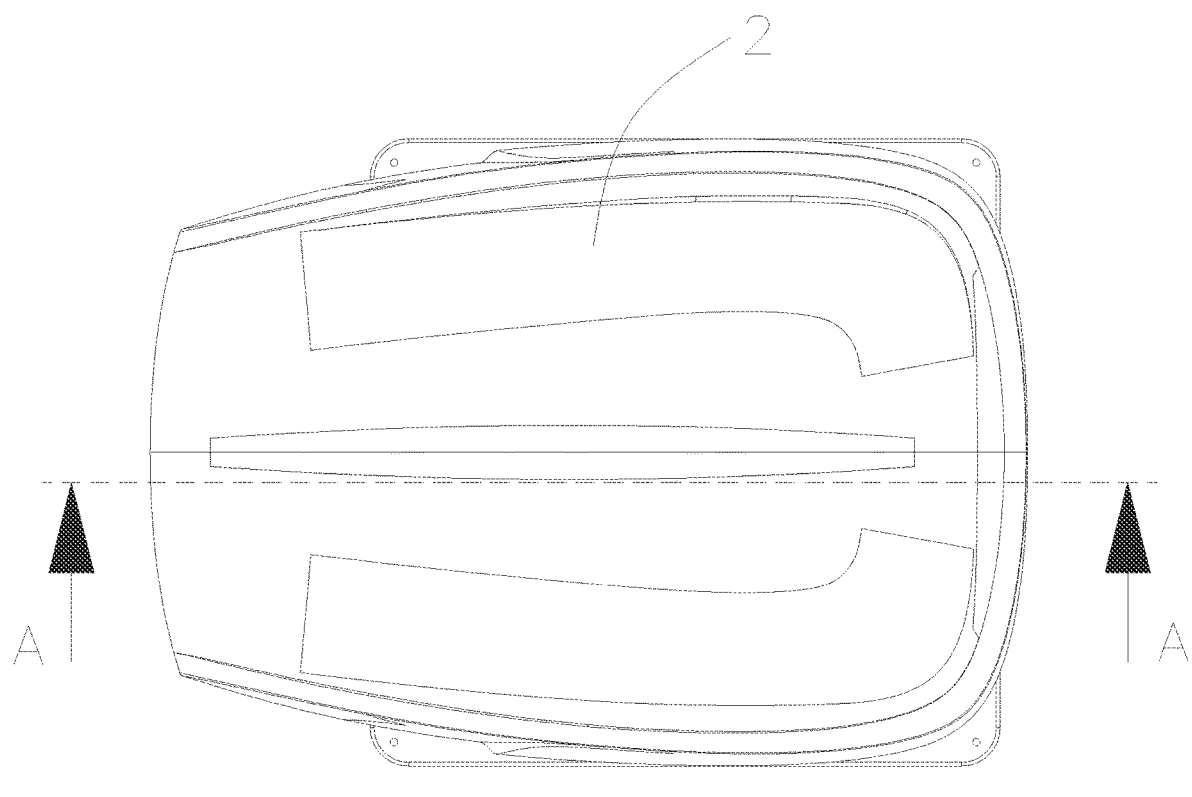
FIG. 3 is a top view of an air intake structure for a vehicle sunroof according to Embodiment 1 of the present disclosure.
Figure 4:
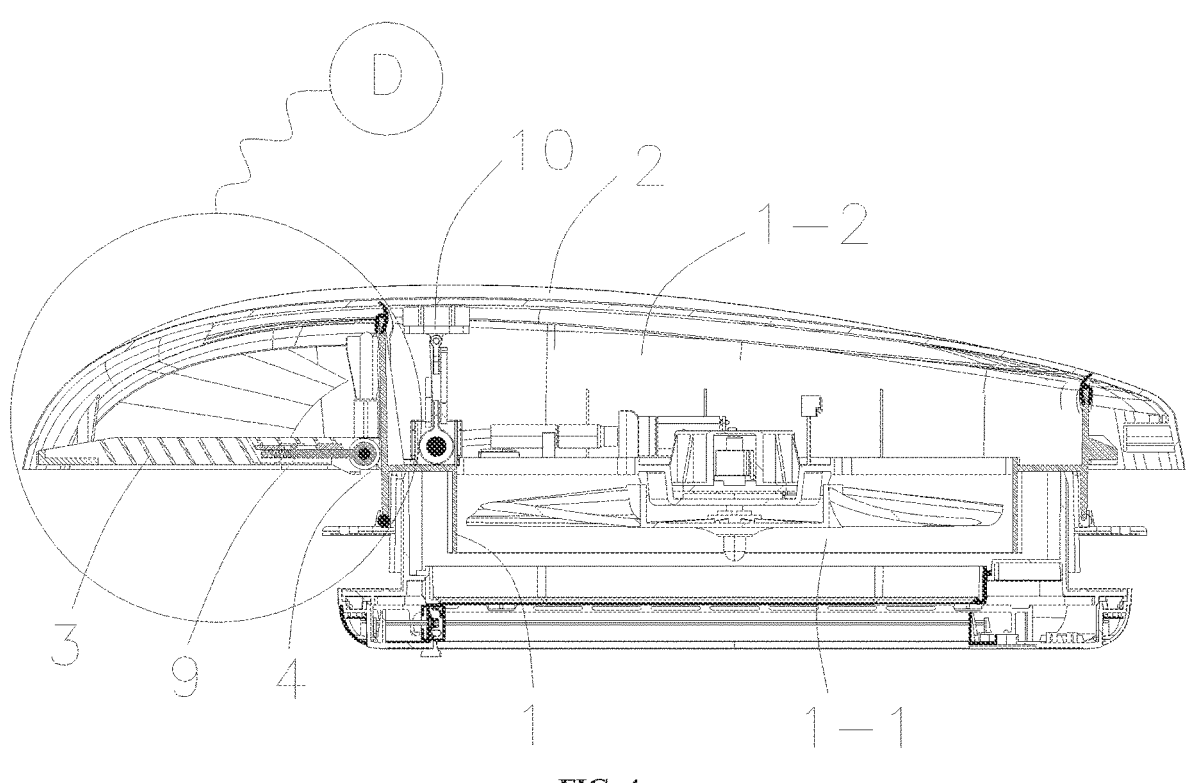
FIG. 4 is a sectional view along a direction A-A in FIG. 3.
Figure 5:
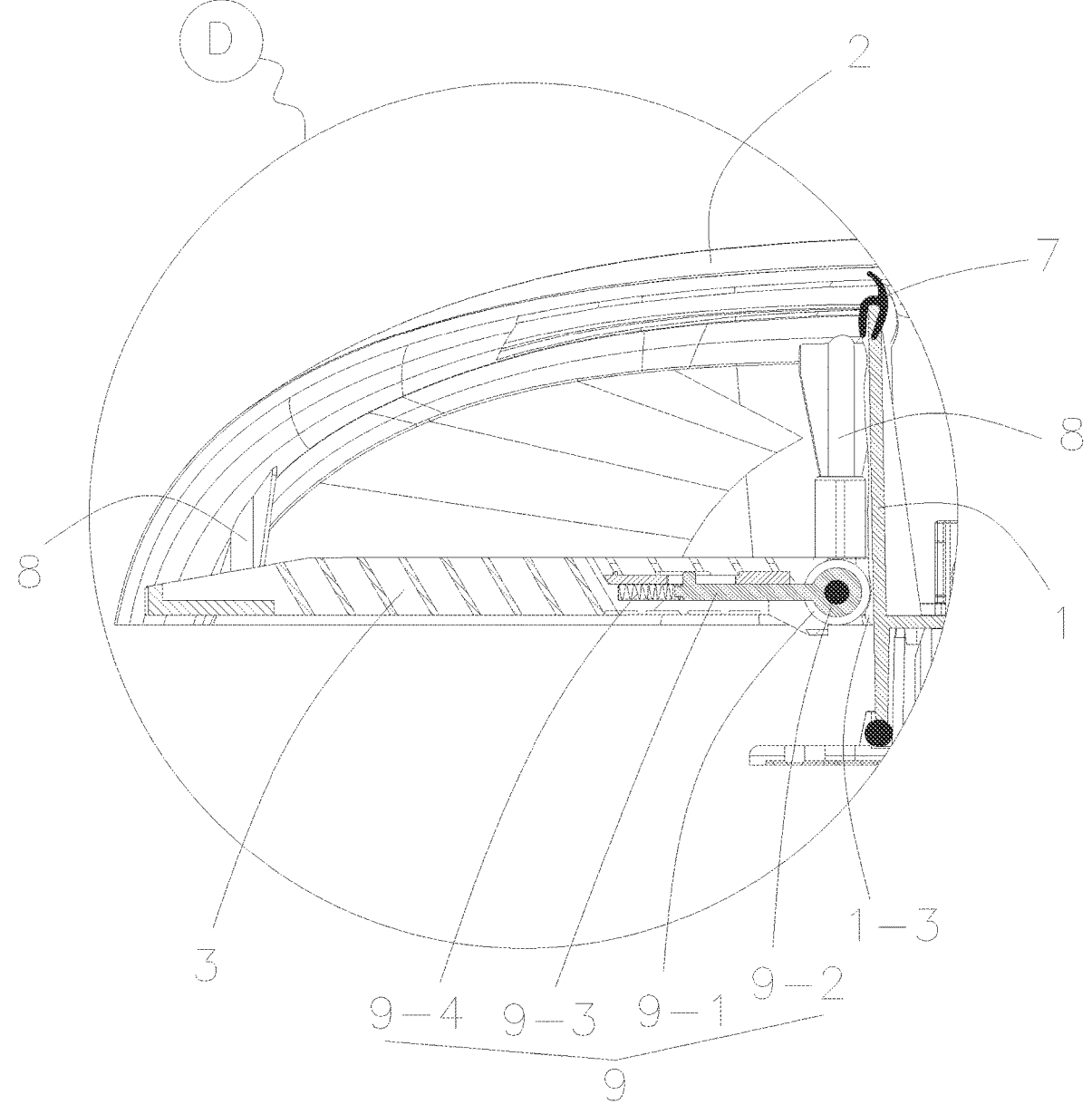
FIG. 5 is a partially enlarged view of D in FIG. 4, where an outer cover is closed.
Figure 6:
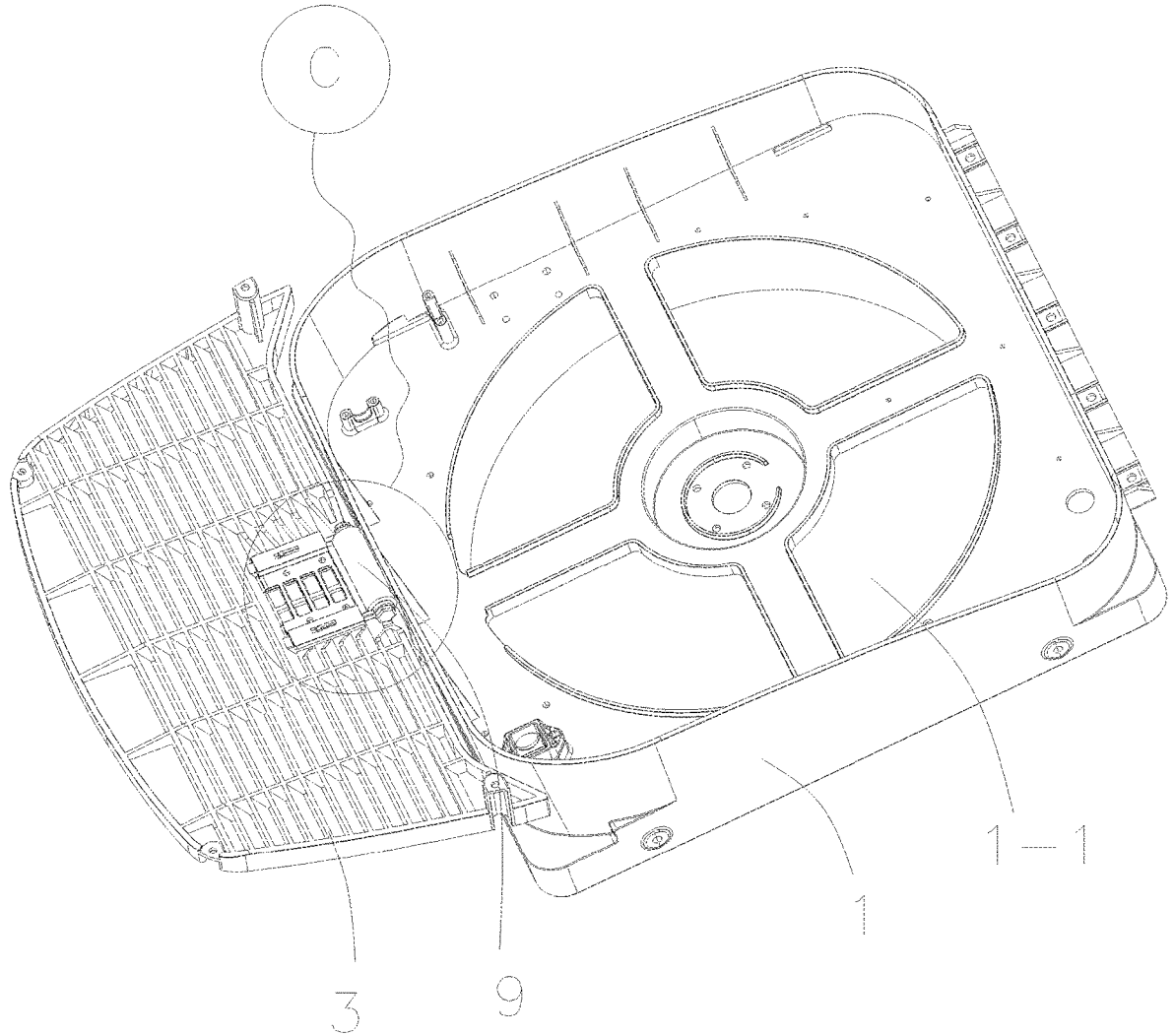
FIG. 6 is a structural stereoscopic view of an air intake structure for a vehicle sunroof according to Embodiment 1 of the present disclosure, where an outer cover and a lifting mechanism are not shown.
Figure 7:
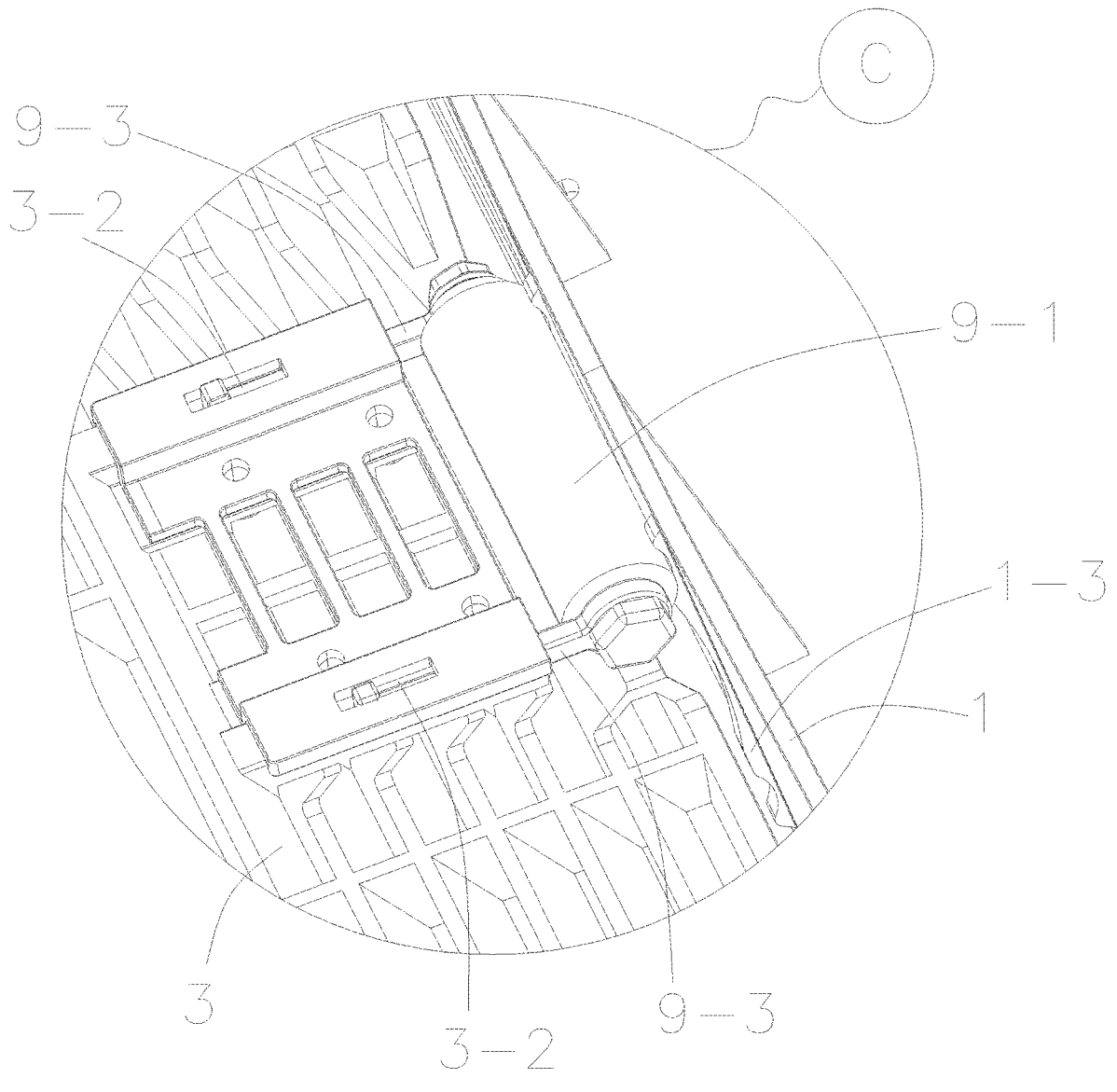
FIG. 7 is a partially enlarged view of C in FIG. 6, where an outer cover is opened.
Figure 8:
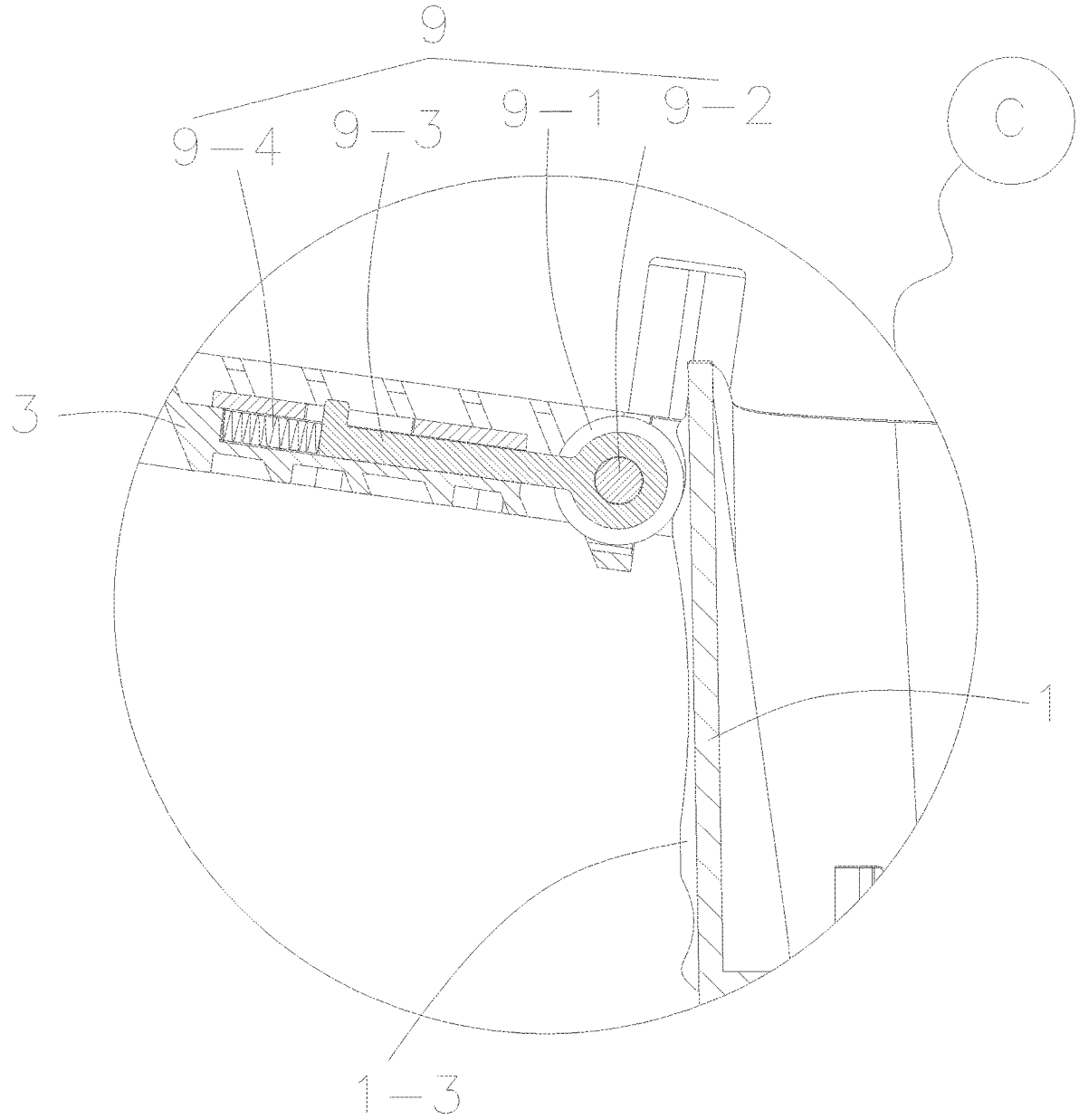
FIG. 8 is a partial sectional view of C in FIG. 6, where an outer cover is opened.

In the embodiment, for convenient installation and detachment of the grille shutter 3, as shown in FIGS. 4-6, the grille shutter 3 is detachably connected to the outer cover 2 through bolts. Further, in order to optimize an installation structure of the grille shutter 3, and make the grille shutter 3 installed more reliably and stably, a plurality of support rods 8 are fixed at a bottom of the outer cover 2 in the embodiment. The plurality of support rods 8 are sequentially arranged around a periphery of the grille shutter 3. The grille shutter 3 is connected to the support rods 8 sequentially by the bolts (not shown in the figure).

In the embodiment, in order to effectively prevent the outer cover 2 and the grille shutter 3 from becoming loose or unstable, and avoid an abnormal sound, as shown in FIGS. 4-8, an end of the grille shutter 3 close to the base 1 is provided with roller assembly 9. The roller assembly 9 includes rolling wheel 9-1. Track 1-3 is provided on the base 1. The track 1-3 matches with a rotating path of the grille shutter 3, such that the rolling wheel 9-1 abuts against the track 1-3 all the time during rotation of the grille shutter 3. Specifically, in the embodiment, the roller assembly 9 further includes rotating shaft 9-2 and connecting rod 9-3. Guide groove 3-2 is formed in the grille shutter 3. The connecting rod 9-3 includes one end slidably provided in the guide groove 3-2, and the other end connected to the rotating shaft 9-2. The rolling wheel 9-1 is sleeved on the rotating shaft 9-2. Spring 9-4 is provided between an end of the connecting rod 9-3 away from the rotating shaft 9-2 and the guide groove 3-2. The rolling wheel 9-1 is pressed on the track 1-3 all the time under an action of the spring 9-4. Through undulation of the track 1-3, a shaking space of the outer cover 2 in opening and closing is eliminated, and a maximum opening angle of the outer cover 2 is limited. The roller assembly 9 has a simple and reliable structure, a skillful design, and a stable operation.

In the embodiment, in order to ensure sealing performance of the closed outer cover 2, and effectively prevent air leakage and water leakage of the sunroof, as shown in FIG. 5, sealing ring 7 is provided at the air intake 1-2. When the outer cover 2 cooperates with the base 1 to cover the air intake 1-2, the outer cover 2 comes in contact with the sealing ring 7.

Figure 9:
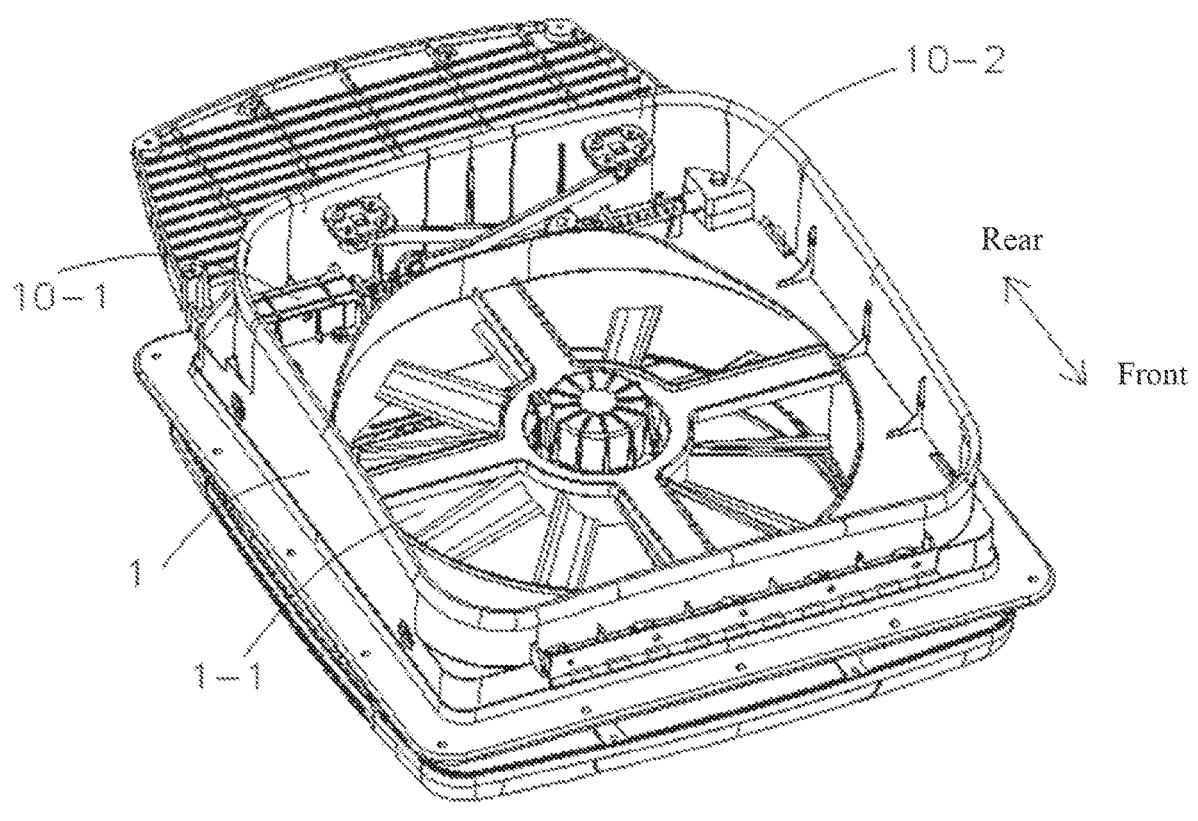
FIG. 9 is a structural stereoscopic view of an air intake structure for a vehicle sunroof from another perspective according to Embodiment 1 of the present disclosure, where an outer cover is not shown.
Figure 10:
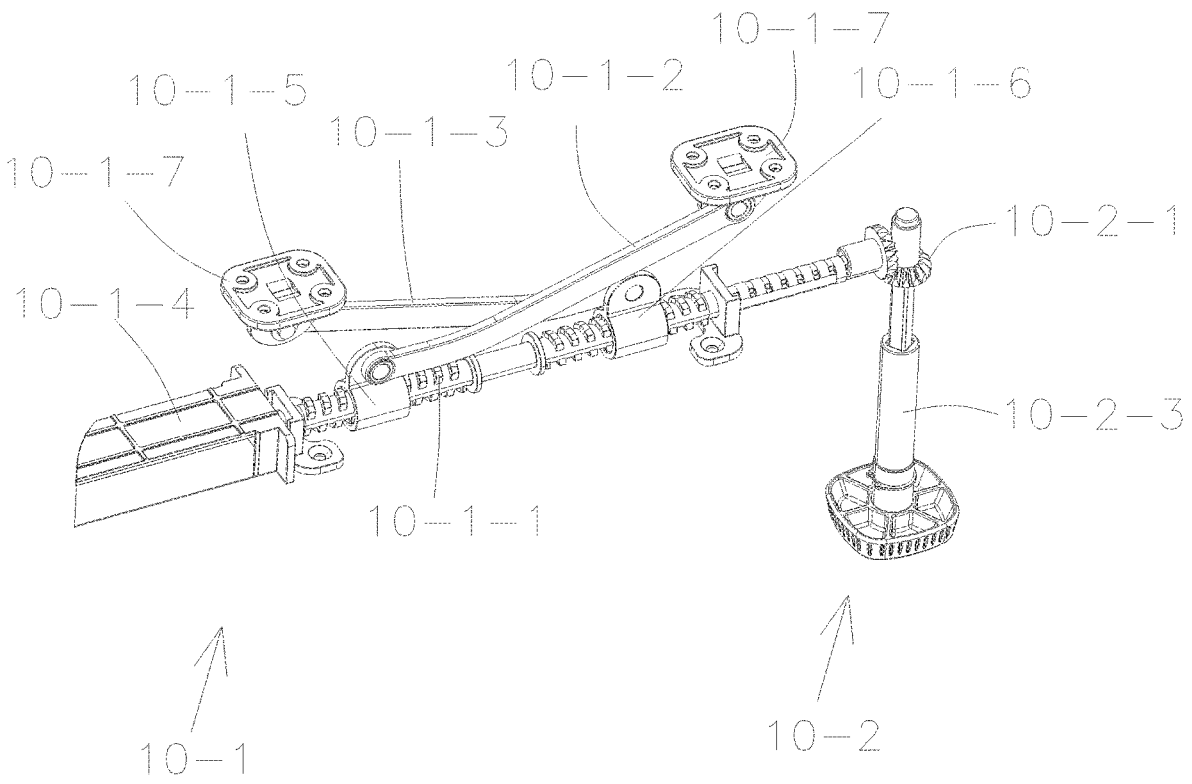
FIG. 10 is a structural stereoscopic view of a lifting mechanism in FIG. 9.
Figure 11:
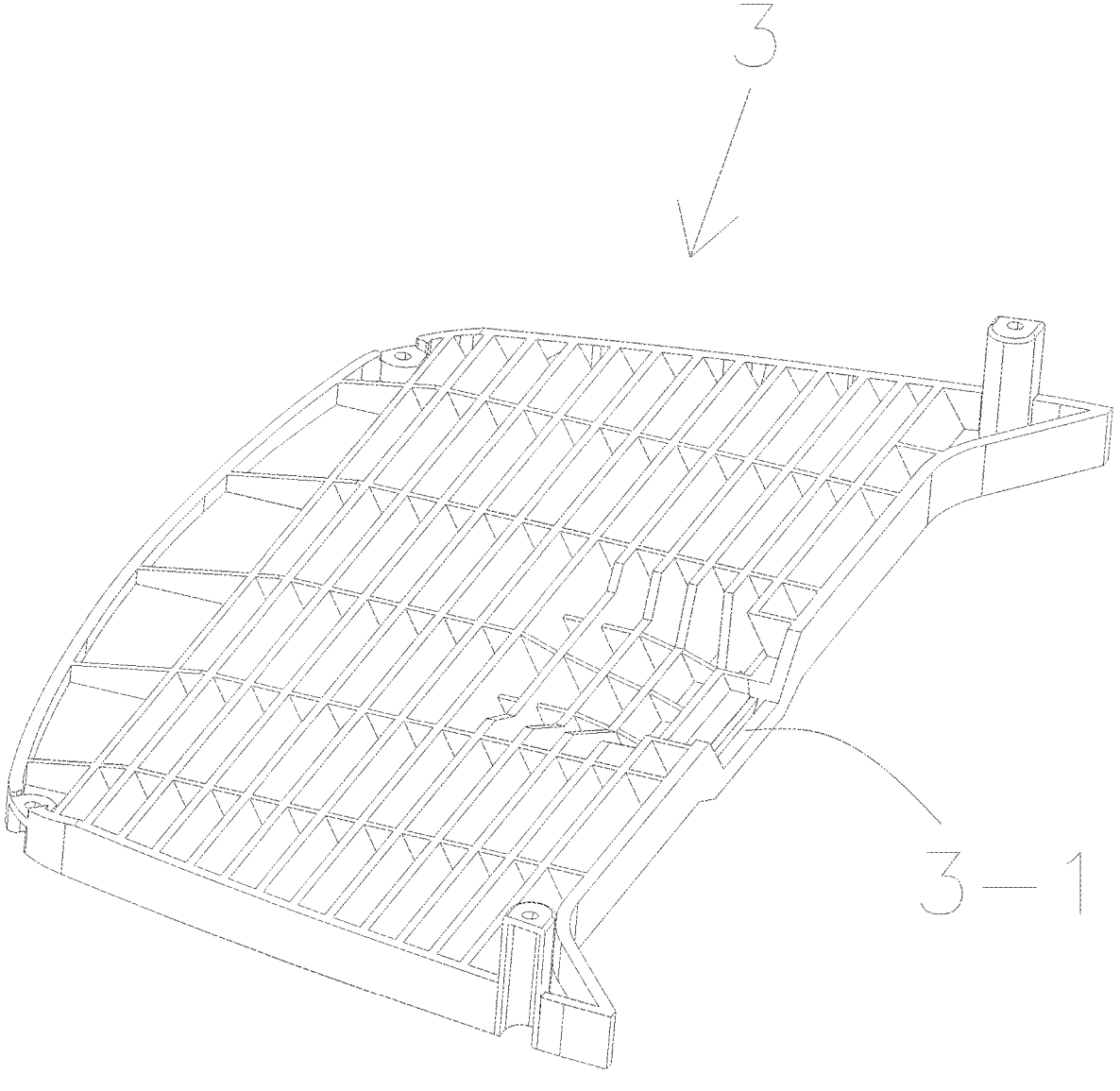
FIG. 11 is a structural stereoscopic view of a grille shutter in an air intake structure for a vehicle sunroof according to Embodiment 1 of the present disclosure.
Figure 12:
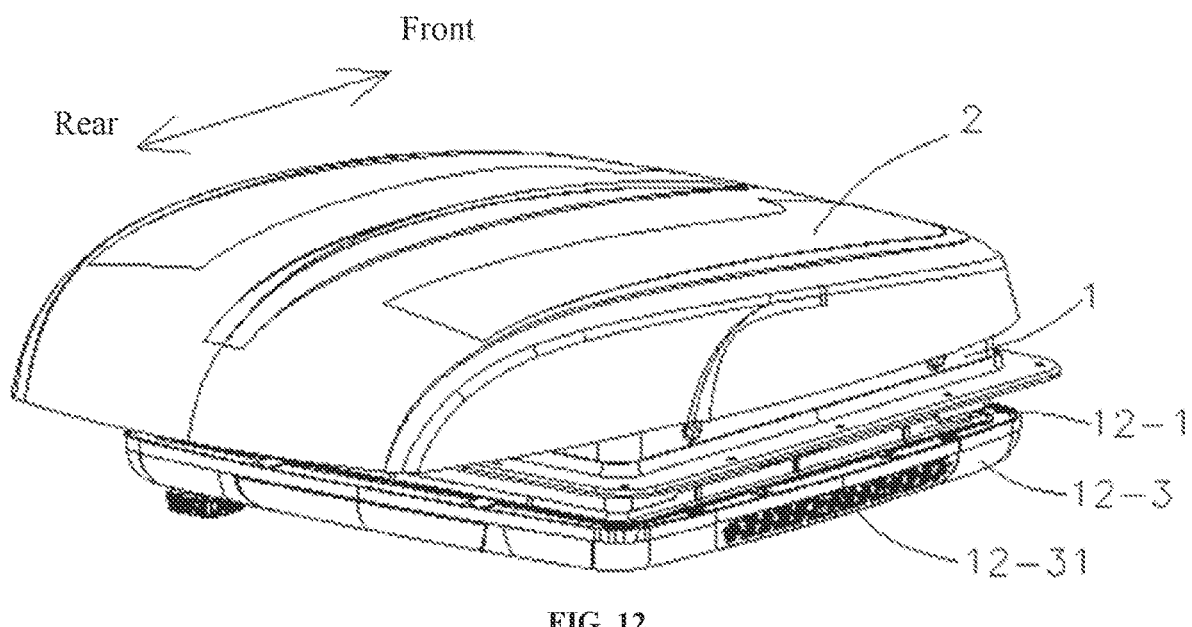
FIG. 12 is a structural stereoscopic view of an RV sunroof according to Embodiment 2 of the present disclosure.

In the embodiment, as shown in FIG. 4, FIG. 9 and FIG. 10, the vehicle sunroof further includes lifting mechanism 10. The lifting mechanism 10 is configured to drive the outer cover 2 to rotate upward to open the ventilation duct 1-1 or rotate downward to close the ventilation duct 1-1. In the embodiment, the outer cover 2 has an opening angle of α, 0°<α≤10°. This not only ensures effective ventilation of the sunroof after the outer cover 2 is opened, but also makes the sunroof reliable, stable, safe and aesthetically-pleasing. The lifting mechanism 10 includes electric drive structure 10-1 and manual drive structure 10-2. The electric drive structure 10-1 includes threaded rod 10-1-1, first cantilever 10-1-2, second cantilever 10-1-3, and motor 10-14. The manual drive structure 10-2 includes gear set 10-2-1 and handle 10-2-3. The threaded rod 10-1-1 is horizontally provided on the base 1 along a width direction of an RV and located behind the ventilation duct 1-1. A bottom end of the first cantilever 10-1-2 is threadedly connected to the threaded rod 10-1-1 through first slider 10-1-5. A bottom end of the second cantilever 10-1-3 is threadedly connected to the threaded rod 10-1-1 through second slider 10-1-6. A top end of the first cantilever 10-1-2 and a top end of the second cantilever 10-1-3 are hinged to supporting seat 10-1-7. The supporting seat 10-1-7 is connected to the outer cover 2. The first cantilever 10-1-2 intersects with the second cantilever 10-1-3. An output end of the motor 10-1-4 is connected to one end of the threaded rod 10-1-1. An input end of the gear set 10-2-1 is connected to the handle 10-2-3. The handle 10-2-3 is exposed in the vehicle. An output end of the gear set 10-2-1 is connected to an end of the threaded rod 10-1-1 away from the motor 10-1-4. When the threaded rod 10-1-1 rotates, the first cantilever 10-1-2 and the second cantilever 10-1-3 are driven to move close to each other or away from each other.

An RV with a sunroof includes the air intake structure for a vehicle sunroof. The base 1 is provided at a top of the RV. Both the outer cover 2 and the grille shutter 3 are exposed out of the RV.

The working principle is as follows:

The air intake structure for a vehicle sunroof is opened as follows:

The outer cover 2 rotates away from the base 1 to open the air intake 1-2. Meanwhile, the outer cover 2 drives the grille shutter 3 to move close to the base 1, the avoidance gap 4 gradually becomes smaller, and the rolling wheel 9-1 abuts against the track 1-3 all the time under an action of the spring 9-4 during rotation of the grille shutter 3. When the outer cover 2 is fixed at a certain opening angle, the rolling wheel 9-1 helps support the outer cover 2. In this case, the air intake 1-2 communicates with the outside of the carriage through the grille shutter 3. The external airflow sequentially passes through the grille shutter 3, the air intake 1-2 and the ventilation duct 1-1 to enter the carriage.

The air intake structure for a vehicle sunroof is closed as follows:

The outer cover 2 rotates close to the base 1. Meanwhile, the outer cover 2 drives the grille shutter 3 to move away from the base 1. The avoidance gap 4 is gradually formed between the grille shutter 3 and the base 1. The rolling wheel 9-1 abuts against the track 1-3 all the time under an action of the spring 9-4 during rotation of the grille shutter 3, until the air intake 1-2 is covered by the outer cover 2, and the outer cover 2 is sealed by the sealing ring 7. In this case, the rolling wheel 9-1 helps support the outer cover 2.

The air intake structure for a vehicle sunroof is detached as follows:

Only by screwing down the plurality of bolts between the grille shutter 3 and the support rods 8, the grille shutter 3 can be taken down. Therefore, the grille shutter 3 is installed and detached conveniently. The grille shutter 3 is taken down conveniently for maintenance such as cleaning.

Embodiment 2

Figure 13:
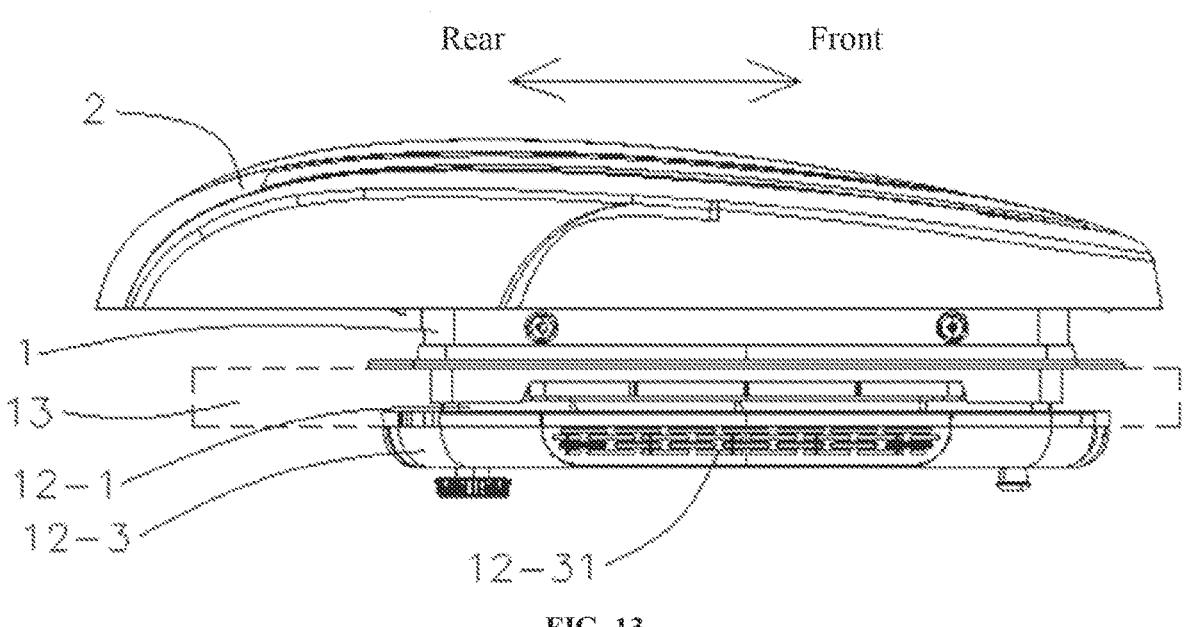
FIG. 13 is a side view of an RV sunroof according to Embodiment 2 of the present disclosure.
Figure 14:
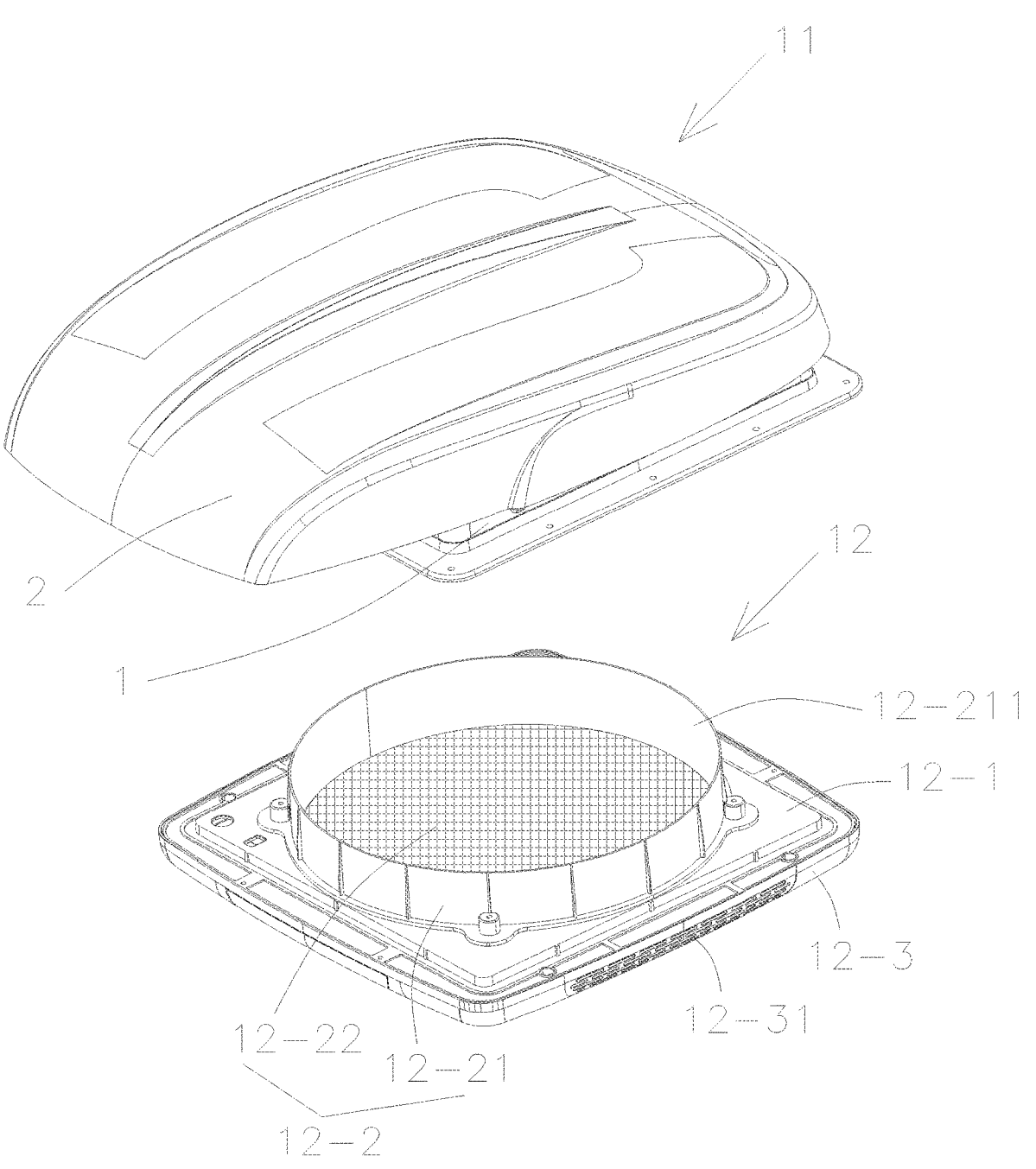
FIG. 14 is an exploded view of an RV sunroof according to Embodiment 2 of the present disclosure.
Figure 15:
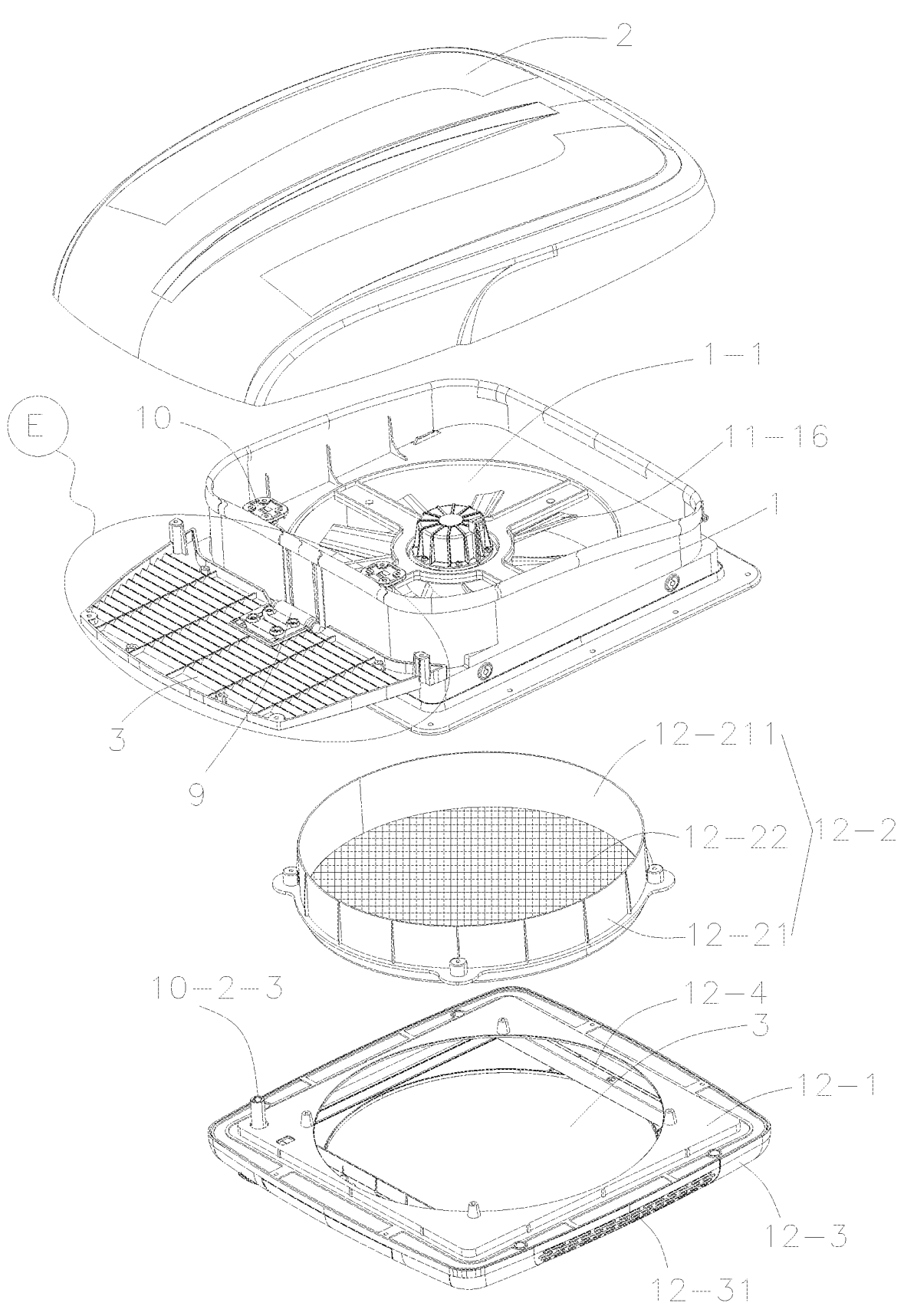
FIG. 15 is a further exploded view of FIG. 14.
Figure 16:
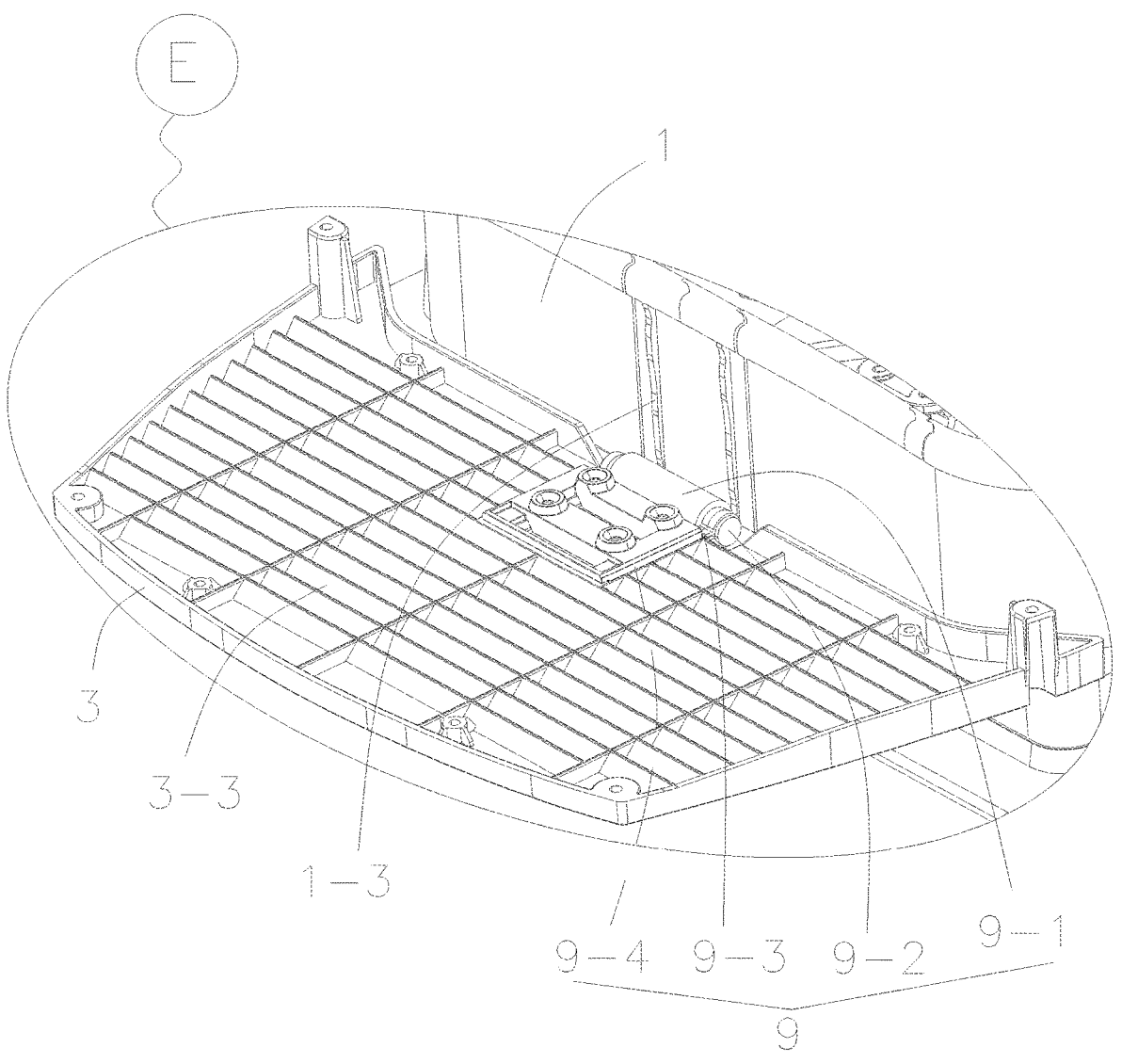
FIG. 16 is a partially enlarged view of E in FIG. 15.

As shown in FIGS. 12-21, the embodiment differs from Embodiment 1 in: The vehicle sunroof further includes upper assembly 11 and lower assembly 12. As shown in FIG. 14, FIG. 15, FIG. 17 and FIG. 18, the base 1, the outer cover 2 and the grille shutter 3 form the upper assembly 11. When the outer cover 2 closes the ventilation duct 1-1, the grille shutter 3 is horizontally provided, and grille holes 3-3 of the grille shutter 3 gradually incline forward from bottom to top. As shown in FIG. 14 and FIG. 15, the lower assembly 12 includes lower seat 12-1 and filter screen assembly 12-2. The ventilation duct 1-1 penetrates through the lower seat 12-1. The filter screen assembly 12-2 includes filter screen frame 12-21 and filter screen 12-22 on the filter screen frame 12-21. The filter screen frame 12-21 is detachably connected to the lower seat 12-1. The filter screen 12-22 is located in the ventilation duct 1-1. As shown in FIG. 13, FIG. 14, FIG. 19 and FIG. 21, the base 1 and the lower seat 12-1 are respectively provided at an upper side and a lower side of top plate 13 of an RV. A bottom of the base 1 serves as first cylindrical portion 1-4. A top of the filter screen frame 12-21 serves as second cylindrical portion 12-211. The first cylindrical portion 1-4 and the second cylindrical portion 12-211 are sleeved and are capable of moving along a thickness direction of the top plate 13. When the outer cover 2 opens the ventilation duct 1-1, the outside, the grille shutter 3, the ventilation duct 1-1, the filter screen 12-22 and the carriage of the RV are sequentially communicated with each other.

Figure 20:
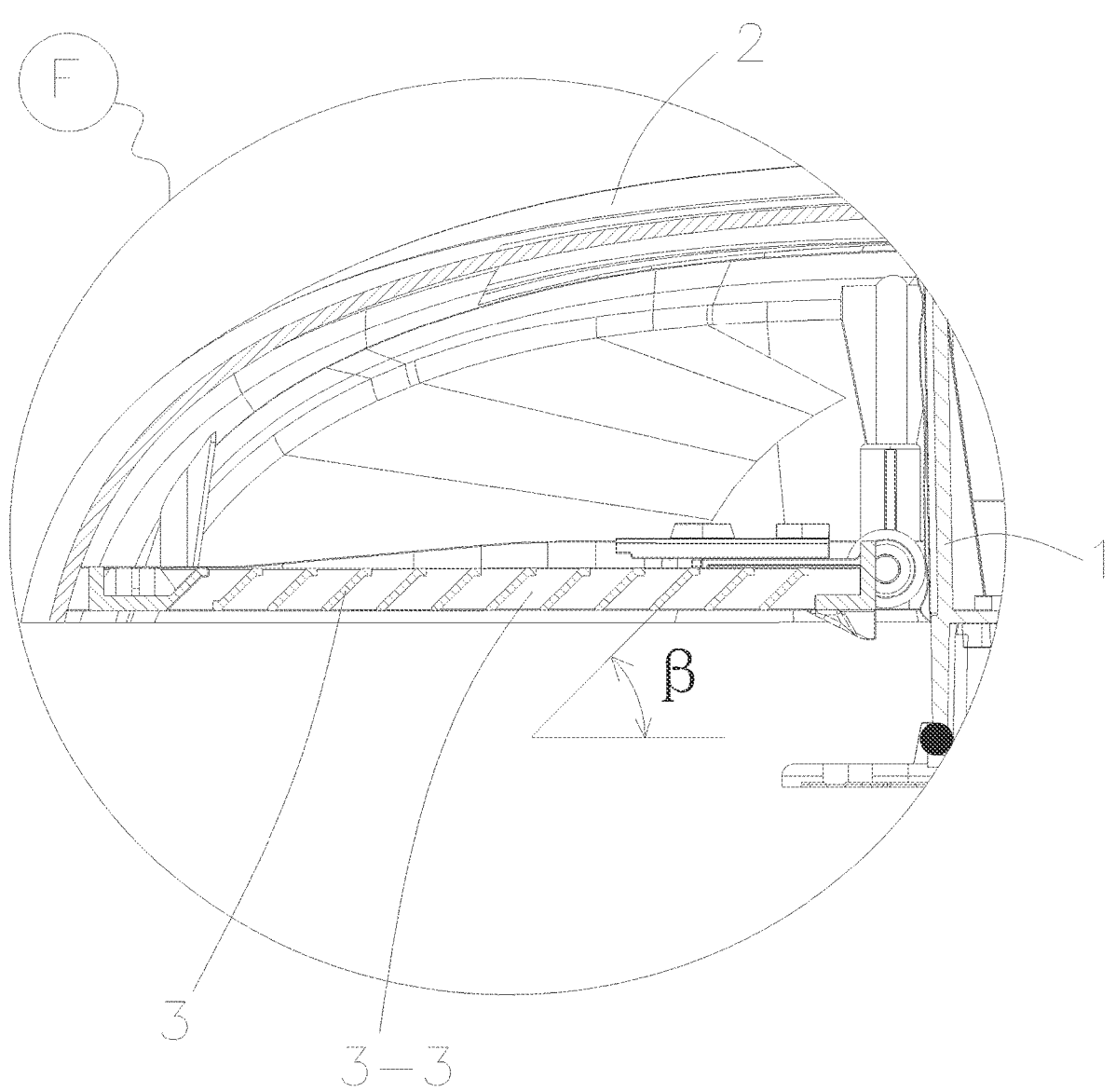
FIG. 20 is a partially enlarged view of F in FIG. 19.

Further, in the embodiment, as shown in FIG. 20, the grille holes 3-3 each have an inclination angle of β, the β being in a range of 30° to 60°. The β may be 45°. This ensures smooth connection between the grille hole 3-3 and the outer cover 2 with no obstruction and more smooth airflow in ventilation, and effectively increases a ventilation volume. The grille hole 3-3 has a cross-sectional area of S, the S being in a range of 3.0 cm² to 3.6 cm². Optionally, the S is 3.3 cm². With the appropriate grille hole 3-3, not only is the airflow combed to become smoother and more comfortable, but also sundries, mosquitoes and the like are effectively filtered. In cooperation with the filter screen 12-22, double-layer filtration is realized to effectively prevent the mosquitoes, and make the filtered air clean and fresh. The grille shutter is more aesthetically-pleasing for a small perspective area.

Further, in the embodiment, as shown in FIG. 13, FIG. 14 and FIG. 15, the lower seat 12-1 is detachably connected to the top plate 13 through a first bolt, and the filter screen frame 12-21 is detachably connected to the lower seat 12-1 through a second bolt. As shown in FIG. 13, FIG. 14, FIG.

Figure 17:
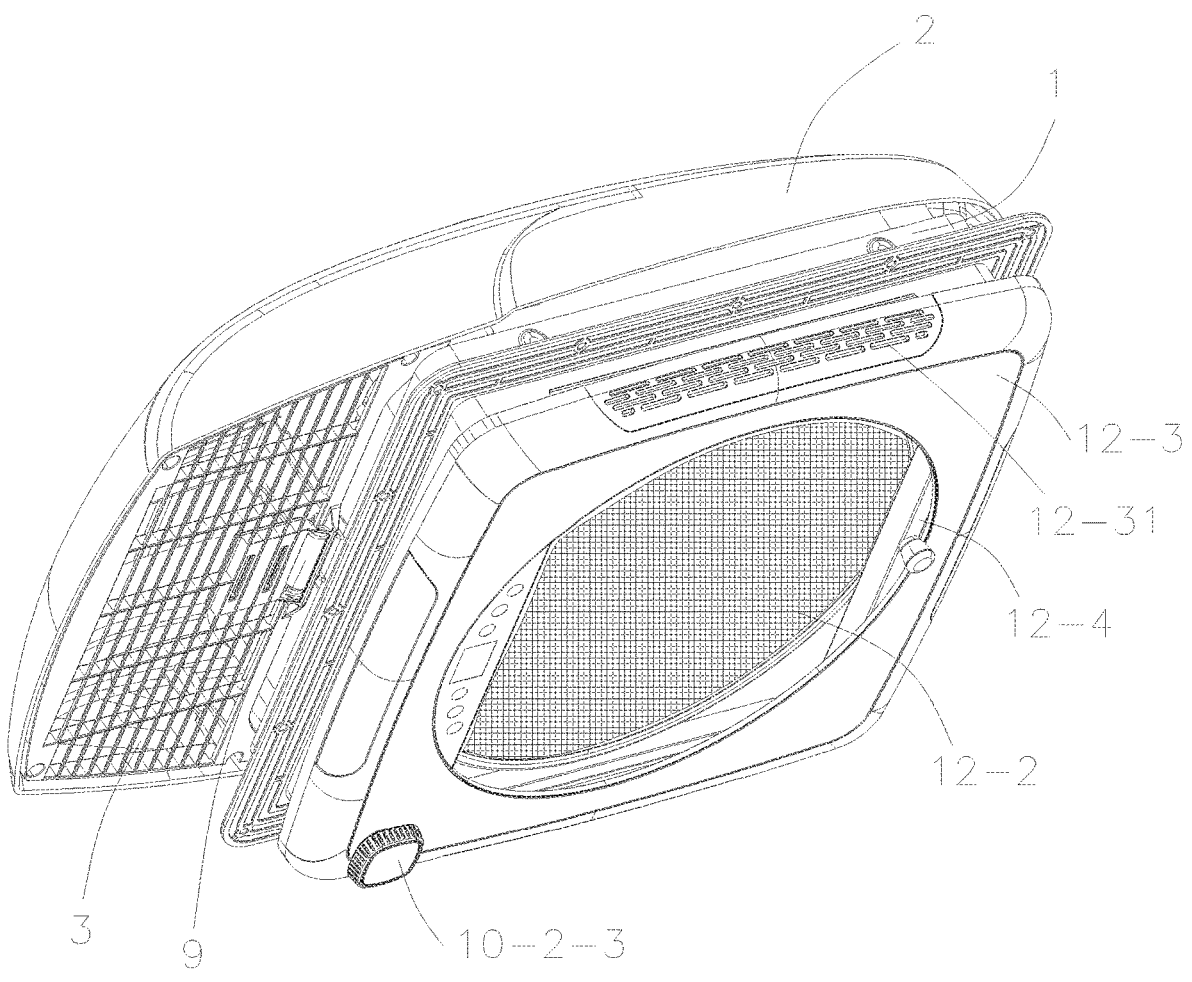
FIG. 17 is a structural stereoscopic view of an RV sunroof from another perspective according to Embodiment 2 of the present disclosure.
Figure 18:
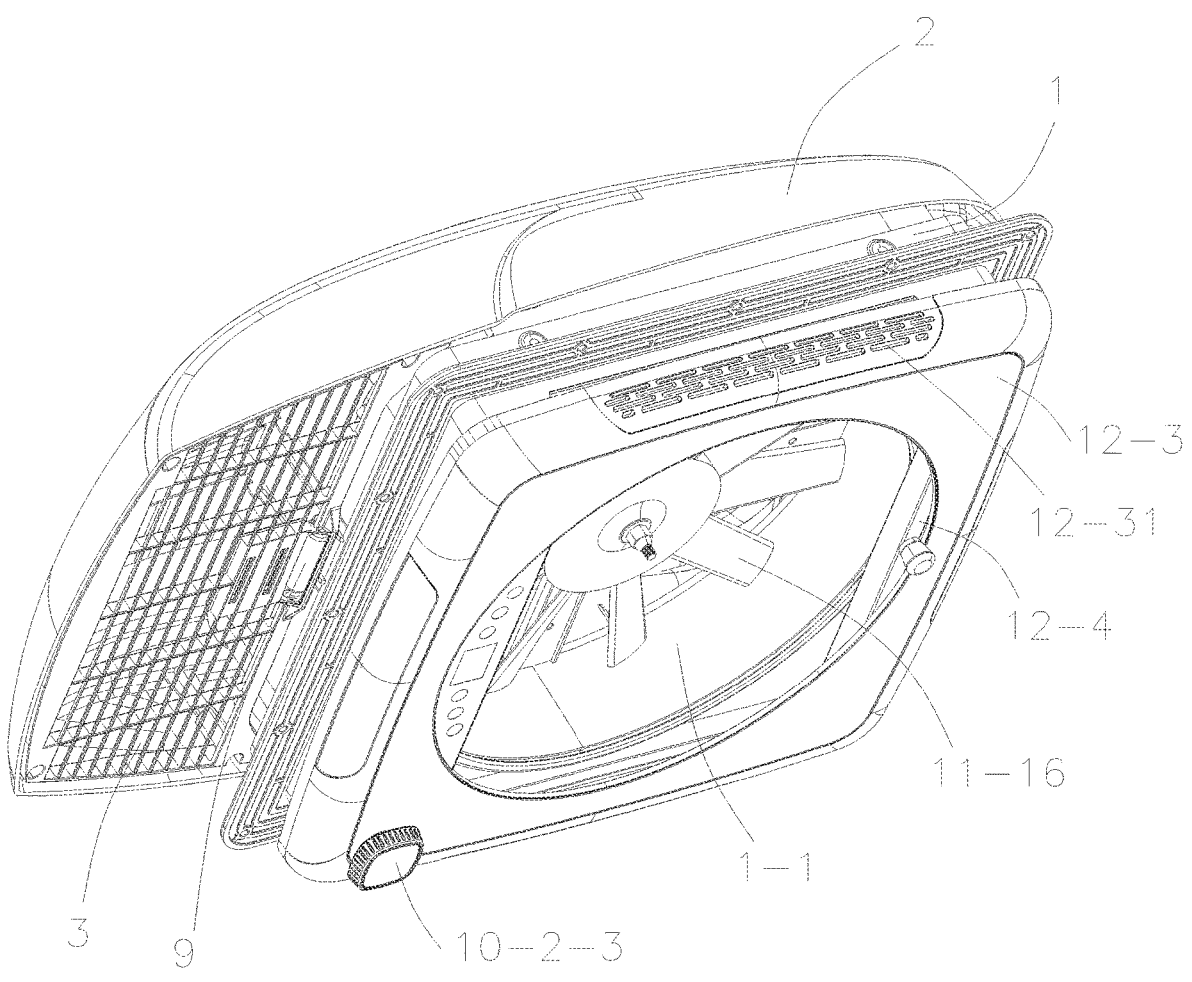
FIG. 18 is a structural stereoscopic view when a filter screen assembly is detached in FIG. 17.

15, FIG. 17 and FIG. 18, decorative cover 12-3 is provided at a bottom of the lower seat 12-1. The first bolt is fixedly connected to the decorative cover 12-3, the lower seat 12-1 and the top plate 13 in sequence. While taking protective and dustproof actions, the decorative cover 12-3 is aesthetically-pleasing. Pleated blackout fabric 12-4 is provided in the decorative cover 12-3. Side air vent 12-31 is formed at a side of the decorative cover 12-3. When the pleated blackout fabric 12-4 is unfolded, the pleated blackout fabric 12-4 covers the ventilation duct 1-1, and the side air vent 12-31 communicates with the ventilation duct 1-1 and the carriage of the RV. While taking an aesthetically-pleasing action, the unfolded pleated blackout fabric 12-4 increases an air volume of the side air vent 12-31 and changes an air-out direction. A pattern may be provided on the pleated blackout fabric 12-4 to be more aesthetically-pleasing.

Figure 19:
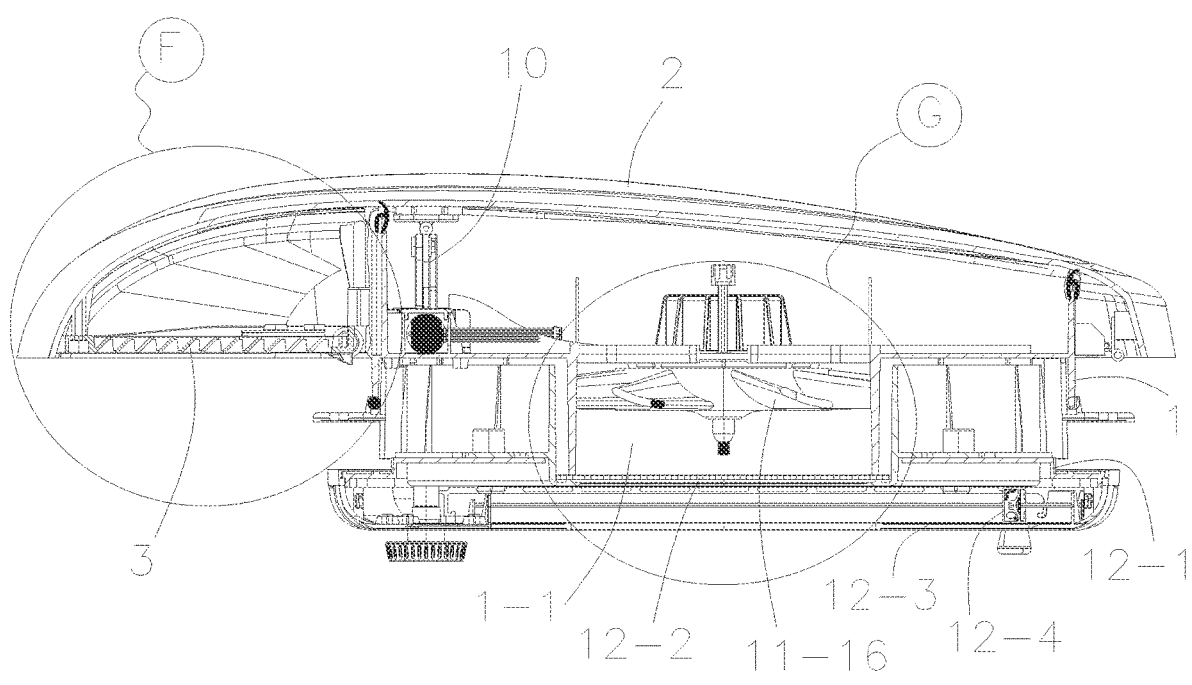
FIG. 19 is a sectional view of an RV sunroof according to Embodiment 2 of the present disclosure.
Figure 21:
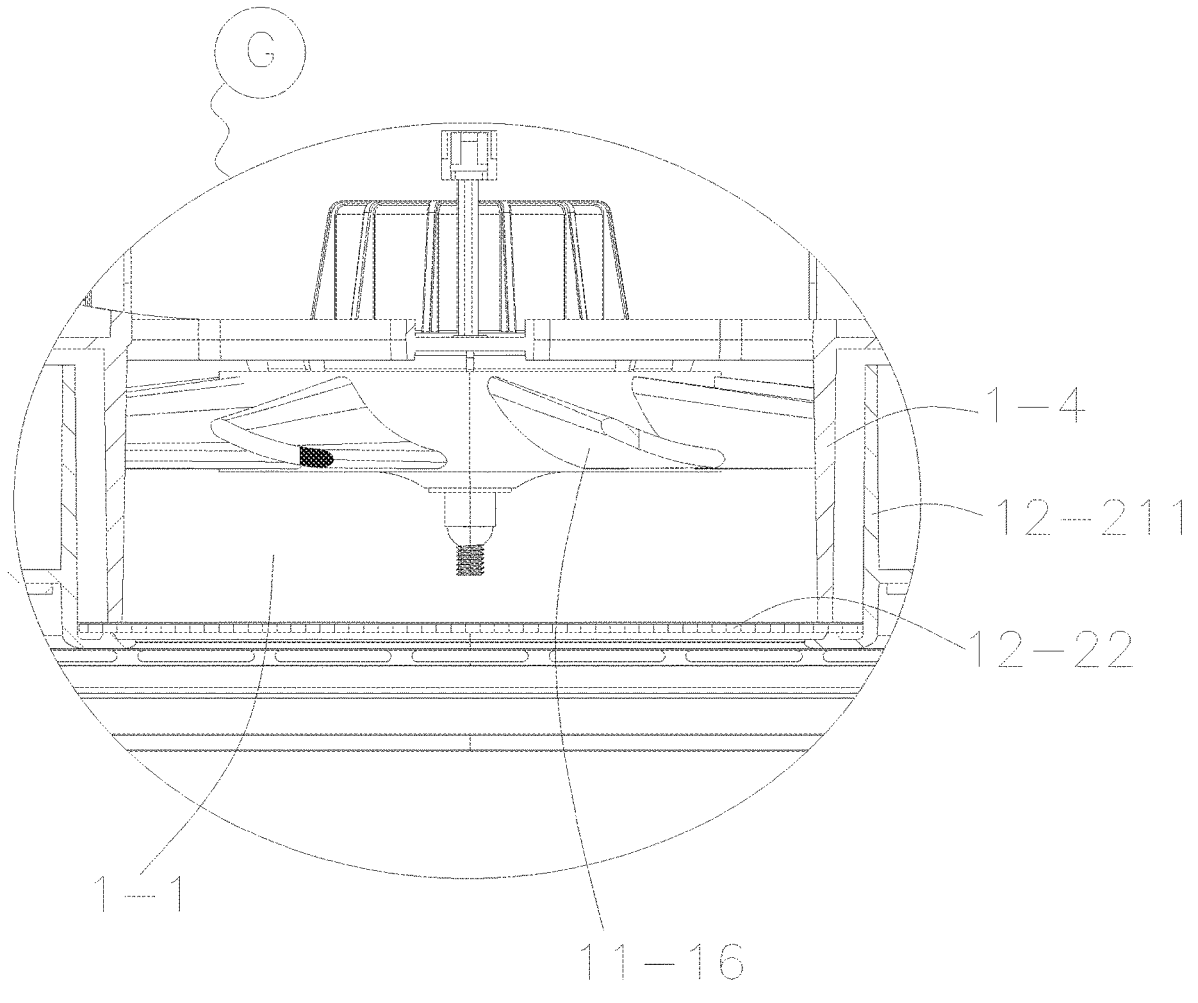
FIG. 21 is a partially enlarged view of G in FIG. 19.

As shown in FIG. 18, FIG. 19 and FIG. 21, ventilation fan 11-16 is provided in the base 1 in the embodiment. The ventilation fan 11-16 is located in the ventilation duct 1-1.

The filter screen assembly 12-2 is detached as follows:

The lower assembly 12 is detached by detaching the first bolt. By detaching the second bolt, the filter screen assembly 12-2 is detached from the lower assembly 12. With convenient detachment, the filter screen 12-22 is repaired, maintained and cleaned conveniently in daily life. Particularly, it is to be noted that since the second cylindrical portion 12-211 of the filter screen frame 12-21 and the first cylindrical portion 1-4 of the base 1 are sleeved, and can move along the thickness direction of the top plate 13, top plates 13 with different thicknesses can be matched. That is, the top plates 13 with the different thicknesses are matched by allowing the second cylindrical portion 12-211 of the filter screen frame 12-21 and the first cylindrical portion 1-4 of the base 1 to move along the thickness direction of the top plate 13. In this case, the first cylindrical portion 1-4 and the second cylindrical portion 12-211 are still sleeved to allow the airflow to pass through.

The above described are merely preferred specific implementations of the present disclosure, and the protection scope of the present disclosure is not limited thereto. Any equivalent substitutions or changes made by those skilled in the art according to the technical solutions and concepts of the present disclosure within the technical scope of the present disclosure should be covered by the protection scope of the present disclosure.

What is claimed is:

1. An air intake structure for a vehicle sunroof, comprising a base, an outer cover, and a grille shutter, wherein a front end of the base is hinged with a front end of the outer cover; a ventilation duct is formed in the base in a penetrating manner; the grille shutter is provided below a rear end of the outer cover; the grille shutter is detachably connected to the outer cover; the grille shutter is located outside an air intake of the ventilation duct; when the outer cover cooperates with the base to cover the air intake, an avoidance gap is formed between the grille shutter and the base; and when the outer cover rotates away from the base to open the air intake, the outer cover drives the grille shutter to move adjacent to the base, the avoidance gap becomes smaller gradually, and an external airflow sequentially passes through the grille shutter, the air intake and the ventilation duct to enter a carriage;

an end of the grille shutter adjacent to the base is provided with a roller assembly; the roller assembly comprises a rolling wheel; a track is provided on the base; and the track matches with a rotating path of the grille shutter, wherein the rolling wheel abuts against the track all the time during a rotation of the grille shutter; and the roller assembly further comprises a rotating shaft and a connecting rod; a guide groove is formed in the grille shutter; the connecting rod comprises a first end slidably provided in the guide groove, and a second end connected to the rotating shaft; the rolling wheel is sleeved on the rotating shaft; and a spring is provided between an end of the connecting rod away from the rotating shaft and the guide groove;

wherein the air intake structure for the vehicle sunroof further comprises a lifting mechanism; the lifting mechanism is configured to drive the outer cover to rotate upward to open the ventilation duct or rotate downward to close the ventilation duct; the lifting mechanism comprises an electric drive structure and a manual drive structure;

the electric drive structure comprises a threaded rod, a first cantilever, a second cantilever, and a motor;

the manual drive structure comprises a gear set and a handle;

the threaded rod is horizontally provided on the base along a width direction of a recreational vehicle (RV) and located behind the ventilation duct;

a bottom end of the first cantilever is threadedly connected to the threaded rod through a first slider;

a bottom end of the second cantilever is threadedly connected to the threaded rod through a second slider;

a top end of the first cantilever and a top end of the second cantilever are connected to the outer cover through a supporting seat;

the first cantilever intersects with the second cantilever;

an output end of the motor is connected to one end of the threaded rod; the gear set comprises an input end connected to the handle, and an output end connected to an end of the threaded rod away from the motor; and when the threaded rod rotates, the first cantilever and the second cantilever are driven to move adjacent to each other or away from each other.

2. The air intake structure for the vehicle sunroof according to claim 1, wherein the outer cover has an opening angle of α, 0°<α≤10°.

3. The air intake structure for the vehicle sunroof according to claim 1, wherein a sealing ring is provided at the air intake, and when the outer cover cooperates with the base to cover the air intake, the outer cover comes in contact with the sealing ring.

4. The air intake structure for the vehicle sunroof according to claim 1, wherein the grille shutter is detachably connected to the outer cover through bolts.

5. A recreational vehicle (RV) with a sunroof, comprising the air intake structure for the vehicle sunroof according to claim 1, wherein the base is provided at a top of the RV, and both the outer cover and the grille shutter are exposed out of the RV.

6. The air intake structure for the vehicle sunroof according to claim 2, wherein the grille shutter is detachably connected to the outer cover through bolts.

7. The air intake structure for the vehicle sunroof according to claim 3, wherein the grille shutter is detachably connected to the outer cover through bolts.

8. The RV with the sunroof according to claim 5, wherein in the air intake structure, the outer cover has an opening angle of α, 0°<α≤10°.

9. The RV with the sunroof according to claim 5, wherein in the air intake structure, a sealing ring is provided at the air intake, and when the outer cover cooperates with the base to cover the air intake, the outer cover comes in contact with the sealing ring.

10. The RV with the sunroof according to claim 5, wherein in the air intake structure, the grille shutter is detachably connected to the outer cover through bolts.

11. The RV with the sunroof according to claim 10, wherein in the air intake structure, a plurality of support rods are fixed at a bottom of the outer cover; the plurality of support rods are sequentially arranged around a periphery of the grille shutter; and the grille shutter is connected to the plurality of support rods sequentially by the bolts.

12. An air intake structure for a vehicle sunroof, comprising a base, an outer cover, and a grille shutter, wherein a front end of the base is hinged with a front end of the outer cover; a ventilation duct is formed in the base in a penetrating manner; the grille shutter is provided below a rear end of the outer cover; the grille shutter is detachably connected to the outer cover; the grille shutter is located outside an air intake of the ventilation duct; when the outer cover cooperates with the base to cover the air intake, an avoidance gap is formed between the grille shutter and the base; and when the outer cover rotates away from the base to open the air intake, the outer cover drives the grille shutter to move adjacent to the base, the avoidance gap becomes smaller gradually, and an external airflow sequentially passes through the grille shutter, the air intake and the ventilation duct to enter a carriage;

an end of the grille shutter adjacent to the base is provided with a roller assembly; the roller assembly comprises a rolling wheel; a track is provided on the base; and the track matches with a rotating path of the grille shutter, wherein the rolling wheel abuts against the track all the time during a rotation of the grille shutter;

the roller assembly further comprises a rotating shaft and a connecting rod: a guide groove is formed in the grille shutter; the connecting rod comprises a first end slidably provided in the guide groove, and a second end connected to the rotating shaft; the rolling wheel is sleeved on the rotating shaft; and a spring is provided between an end of the connecting rod away from the rotating shaft and the guide groove;

wherein the grille shutter is detachably connected to the outer cover through bolts; and wherein a plurality of support rods are fixed at a bottom of the outer cover; the plurality of support rods are sequentially arranged around a periphery of the grille shutter; and the grille shutter is connected to the plurality of support rods sequentially by the bolts.

13. An air intake structure for a vehicle sunroof, comprising a base, an outer cover, and a grille shutter, wherein a front end of the base is hinged with a front end of the outer cover; a ventilation duct is formed in the base in a penetrating manner; the grille shutter is provided below a rear end of the outer cover; the grille shutter is detachably connected to the outer cover; the grille shutter is located outside an air intake of the ventilation duct; when the outer cover cooperates with the base to cover the air intake, an avoidance gap is formed between the grille shutter and the base; and when the outer cover rotates away from the base to open the air intake, the outer cover drives the grille shutter to move adjacent to the base, the avoidance gap becomes smaller gradually, and an external airflow sequentially passes through the grille shutter the air intake and the ventilation duct to enter a carriage;

an end of the grille shutter adjacent to the base is provided with a roller assembly; the roller assembly comprises a rolling wheel; a track is provided on the base; and the track matches with a rotating path of the grille shutter, wherein the rolling wheel abuts against the track all the time during a rotation of the grille shutter;

the roller assembly further comprises a rotating shaft and a connecting rod; a guide groove is formed in the grille shutter; the connecting rod comprises a first end slidably provided in the guide groove, and a second end connected to the rotating shaft; the rolling wheel is sleeved on the rotating shaft; and a spring is provided between an end of the connecting rod away from the rotating shaft and the guide groove;

wherein the air intake structure for the vehicle sunroof further comprises an upper assembly and a lower assembly; the base, the outer cover and the grille shutter form the upper assembly; and when the outer cover closes the ventilation duct, the grille shutter is horizontally provided, and grille holes of the grille shutter gradually incline forward from bottom to top;

the lower assembly comprises a lower seat and a filter screen assembly; the ventilation duct penetrates through the lower seat; the filter screen assembly comprises a filter screen frame and a filter screen on the filter screen frame; the filter screen frame is detachably connected to the lower seat; and the filter screen is located in the ventilation duct; and the base and the lower seat are respectively provided at an upper side and a lower side of a top plate of an RV; a bottom of the base serves as a first cylindrical portion; a top of the filter screen frame serves as a second cylindrical portion; the first cylindrical portion and the second cylindrical portion are sleeved and are allowed to move along a thickness direction of the top plate; and when the outer cover opens the ventilation duct, an outside of the RV, the grille shutter, the ventilation duct, the filter screen, and the carriage of the RV are sequentially communicated with each other.

14. The air intake structure for the vehicle sunroof according to claim 13, wherein the grille holes each have an inclination angle of β, the β being in a range of 30° to 60°.

15. The air intake structure for the vehicle sunroof according to claim 13, wherein the grille hole has a cross-sectional area of S, the S being in a range of 3.0 cm² to 3.6 cm².

16. The air intake structure for the vehicle sunroof according to claim 13, wherein the lower seat is detachably connected to the top plate through a first bolt, and the filter screen frame is detachably connected to the lower seat through a second bolt.

17. The air intake structure for the vehicle sunroof according to claim 16, wherein a decorative cover is provided at a bottom of the lower seat, and the first bolt is fixedly connected to the decorative cover, the lower seat and the top plate in sequence.

18. The air intake structure for the vehicle sunroof according to claim 17, wherein a pleated blackout fabric is provided in the decorative cover; a side air vent is formed at a side of the decorative cover; and when the pleated blackout fabric is unfolded, the pleated blackout fabric covers the ventilation duct, and the side air vent communicates with the ventilation duct and the carriage of the RV.

19. The air intake structure for the vehicle sunroof according to claim 14, wherein the grille hole has a cross-sectional area of S, the S being in a range of 3.0 cm² to 3.6 cm².

* * * * *